United States Patent
Isaacs et al.

(10) Patent No.: US 11,372,251 B2
(45) Date of Patent: Jun. 28, 2022

(54) SYSTEMS, DEVICES, AND METHODS FOR ELECTRICAL PATHWAYS BETWEEN COMPONENTS IN WEARABLE HEADS-UP DISPLAYS

(71) Applicant: GOOGLE LLC, Mountain View, CA (US)

(72) Inventors: Philip Michael Isaacs, Kitchener (CA); Joshua Moore, Elora (CA)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/897,799

(22) Filed: Jun. 10, 2020

(65) Prior Publication Data

US 2020/0393685 A1 Dec. 17, 2020

Related U.S. Application Data

(60) Provisional application No. 62/862,355, filed on Jun. 17, 2019.

(51) Int. Cl.
*G02B 27/01* (2006.01)
*H04B 1/3827* (2015.01)

(52) U.S. Cl.
CPC ..... *G02B 27/0176* (2013.01); *G02B 27/0101* (2013.01); *G02B 2027/014* (2013.01); *G02B 2027/0138* (2013.01); *G02B 2027/0161* (2013.01); *G02B 2027/0178* (2013.01); *H04B 1/385* (2013.01)

(58) Field of Classification Search
CPC ............ G02B 27/0176; G02B 27/0101; G02B 2027/0161; H04B 1/385
See application file for complete search history.

(56) References Cited

U.S. PATENT DOCUMENTS

| | | | | |
|---|---|---|---|---|
| 7,150,526 | B2 * | 12/2006 | Jannard | H04R 1/1066 |
| | | | | 351/158 |
| 9,482,883 | B1 * | 11/2016 | Meisenholder | G02C 5/22 |
| 10,032,074 | B2 * | 7/2018 | Publicover | A61B 3/0025 |
| 10,379,376 | B2 * | 8/2019 | Kuczewski | G02B 27/0176 |
| 10,613,355 | B2 * | 4/2020 | Blum | G02C 7/083 |
| 10,701,480 | B1 * | 6/2020 | Yang | G02C 5/14 |
| 2002/0197961 | A1 * | 12/2002 | Warren | H04M 1/6066 |
| | | | | 455/66.1 |

(Continued)

FOREIGN PATENT DOCUMENTS

WO WO-2019122806 A1 * 6/2019 ........... G02B 27/017

*Primary Examiner* — Amy Onyekaba

(57) ABSTRACT

Systems, devices, and methods for electrical connection between components of wearable heads-up displays are described. A wearable heads-up display can include a first arm and a second arm, bridged by a front frame. The first arm can carry electrical components, the second arm can carry a power source, and the front frame can carry a set of electrically conductive current paths which provide electrical coupling between the power source and the electrical components. The first arm and the second arm can each rotate about a respective hinge relative to the front frame. A flexible, dynamic set of electrically conductive current paths can couple the electrical components in the first arm to the set of electrically conductive current paths in the front frame, and another flexible, dynamic set of electrically conductive current paths can couple the power source in the second arm to the connector in the front frame.

20 Claims, 20 Drawing Sheets

(56) References Cited

U.S. PATENT DOCUMENTS

| | | | |
|---|---|---|---|
| 2005/0136977 A1* | 6/2005 | Levy | G02C 11/10 455/557 |
| 2007/0058261 A1* | 3/2007 | Sugihara | G02B 6/0011 348/E5.145 |
| 2010/0110368 A1* | 5/2010 | Chaum | G02C 11/10 351/158 |
| 2010/0149073 A1* | 6/2010 | Chaum | G02B 27/0075 345/8 |
| 2010/0245757 A1* | 9/2010 | Sugihara | G02B 27/0172 351/158 |
| 2013/0070198 A1* | 3/2013 | Willey | G02C 7/101 351/158 |
| 2013/0120706 A1* | 5/2013 | Kakinuma | G02B 30/24 351/158 |
| 2013/0194141 A1* | 8/2013 | Okajima | H04B 1/385 343/718 |
| 2014/0194078 A1* | 7/2014 | Hikino | H01Q 9/16 455/90.2 |
| 2014/0210689 A1* | 7/2014 | Sheu | G02B 27/017 345/1.3 |
| 2014/0273893 A1* | 9/2014 | Katayama | H04N 5/64 455/90.3 |
| 2015/0123881 A1* | 5/2015 | Sugihara | G02B 27/0176 345/8 |
| 2015/0187141 A1* | 7/2015 | Bromer | G02B 27/0172 345/633 |
| 2015/0248026 A1* | 9/2015 | Willey | H01R 35/04 351/158 |
| 2015/0338660 A1* | 11/2015 | Mukawa | G02B 5/1842 359/13 |
| 2016/0004086 A1* | 1/2016 | Ko | G02B 27/0176 345/8 |
| 2016/0246059 A1* | 8/2016 | Halpin | G02B 27/0176 |
| 2017/0090201 A1* | 3/2017 | Guo | H04R 5/033 |
| 2017/0108714 A1* | 4/2017 | Kuczewski | G02C 5/146 |
| 2017/0279473 A1* | 9/2017 | Hiraoka | H04B 1/385 |
| 2018/0095299 A1* | 4/2018 | Cazalet | G02C 5/12 |
| 2019/0011699 A1* | 1/2019 | Moore | G02B 27/0172 |
| 2019/0033622 A1* | 1/2019 | Olgun | H04B 5/0075 |
| 2019/0196228 A1* | 6/2019 | Moore | H01Q 9/42 |
| 2019/0198981 A1* | 6/2019 | Moore | G02C 5/22 |
| 2019/0198982 A1* | 6/2019 | Moore | H01Q 1/273 |
| 2019/0198983 A1* | 6/2019 | Moore | G02B 27/0176 |
| 2020/0257384 A1* | 8/2020 | Ahne | G06F 3/017 |
| 2020/0355926 A1* | 11/2020 | Williams | G02B 27/0176 |

\* cited by examiner

SYSTEMS, DEVICES, AND METHODS FOR ELECTRICAL PATHWAYS BETWEEN COMPONENTS IN WEARABLE HEADS-UP DISPLAYS

CROSS-REFERENCE TO RELATED APPLICATIONS

This application claims the benefit of U.S. Provisional Patent Application No. 62/862,355, filed Jun. 17, 2019, titled "Systems, Devices, and Methods for Electrical Pathways Between Components in Wearable Heads-up Displays", the content of which is incorporated herein in its entirety by reference.

TECHNICAL FIELD

The present systems, devices, and methods generally relate to wearable heads-up displays and particularly relate to component layouts and electrical pathways between components.

BACKGROUND

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, and typically visible to others, and generally present for long periods of time, form factor (i.e., size, geometry, and appearance) is a major design consideration in wearable electronic devices.

Wearable Heads Up Displays

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

Additionally, users also care a lot about comfort. Since wearable heads-up displays are intended to be worn on the face of a user, wearable heads-up displays should comfortable, otherwise the user will quickly remove the wearable heads-up display due to strain. Wearable heads-up displays tend to be uncomfortable when they are too bulky or have unbalanced bulk.

A challenge in the design of wearable heads-up displays is to minimize and balance the bulk, volume, and weight of the face-worn apparatus while still providing displayed content with sufficient visual quality. There is a need in the art for wearable heads-up displays of more aesthetically-appealing and comfortable design that are capable of providing high-quality images to the user without limiting the user's ability to see their external environment.

Further, it is desirable for a wearable heads up display to fold, collapse, or otherwise shrink down in size when not being used, as this will make the wearable heads-up display take up less storage space and be more portable when not in use. Traditional eyeglasses typically fold at a pair of hinges connecting the temple arms to the front frame, such that the eyeglasses typically fit in a slim rectangular or cylindrical case. It is desirable to achieve similar folding in wearable heads-up displays, but this has proven challenging because electrical components often need to be electrically coupled across such hinges.

Manufacturing Wearable Heads Up Displays

Humans have a large variety of different head and faces sizes, shapes, and geometries, such that a wearable heads up display which fits one user well may not fit a different user very well. To address this, wearable heads up displays may be manufactured in different sizes to accommodate different users. However, this creates manufacturing challenges where different sizes of many components must be designed, constructed, and maintained in inventory. Where possible, practical, and affordable, the present systems, devices, and methods seek to minimize the number of components which will have different sizes for different units.

BRIEF SUMMARY

According to a broad aspect, the description describes a wearable heads-up display ("WHUD") comprising: a support structure to be worn on a head of a user, the support structure comprising a first arm to be positioned on a first side of the head of the user, a second arm to be positioned on a second side of the head of the user opposite the first side of the head of the user, and a front frame to be positioned on a front side of the head of the user, the first arm physically coupled to the front frame by a first hinge and the second arm physically coupled to the front frame by a second hinge; an optical combiner carried by the front frame, the optical combiner to be positioned within a field of view of an eye of the user when the support structure is worn on the head of the user; a light engine carried by the first arm, the light engine positioned and oriented to output display light to the optical combiner when the first hinge is in an unfolded configuration; a power source carried by the second arm; and at least three respective sets of electrically conductive current paths which together provide electrical coupling between the power source and the light engine, the at least three respective sets of electrically conductive current paths including: a first set of electrically conductive current paths carried by the front frame; a second set of electrically conductive current paths that extend across the first hinge, the second set of electrically conductive current paths to provide electrical coupling between the first set of electrically conductive current paths and the light engine; and a third set of electrically conductive current paths that extend across the second hinge, the third set of electrically conductive current paths to provide electrical coupling between the first set of electrically conductive current paths and the power source; wherein the optical combiner is positioned and oriented to direct the display light towards the eye of the user when the first hinge is in the unfolded configuration.

The WHUD may further comprise at least one processor carried by the first arm and a non-transitory processor readable storage medium carried by the first arm, wherein the at least one processor is communicatively coupled to both the non-transitory processor readable storage medium and the light engine, and the second set of electrically conductive current paths provides electrically coupling between the at least one processor and the first set of electrically conductive current paths, and between the non-transitory processor readable storage medium and the first set of electrically conductive current paths. The WHUD may further comprise: at least one camera carried by the support structure; and a fourth set of electrically conductive current paths that extend across the first hinge, the fourth set of electrically conductive current paths to provide electrical coupling between the camera and the at least one processor. The first set of electrically conductive current paths may be non-dynamic electrically conductive current paths, the second set of electrically conductive current paths may be dynamic electrically conductive current paths, the third set of electrically conductive current paths may be dynamic electrically conductive current paths, and the fourth set of electrically conductive current paths may be dynamic electrically conductive current paths. Each of the first set of electrically conductive current paths, the second set of electrically conductive current paths, the third set of electrically conductive current paths, and the fourth set of electrically conductive current paths may be carried by a respective printed circuit board.

The WHUD may further comprise a power supply circuit carried by the first arm, the second set of electrically conductive current paths may provide electrical coupling between the first set of electrically conductive current paths and the power supply circuit, and the power supply circuit may be electrically coupled to each of: the at least one processor, the non-transitory processor readable storage medium, and the light engine. The fourth set of electrically conductive current paths may further provide electrical coupling between the power supply circuit and the at least one camera across the first hinge.

The second set of electrically conductive current paths may provide electrical coupling between the first set of electrically conductive current paths and the light engine when the first hinge is in the unfolded configuration. The third set of electrically conductive current paths may provide electrical coupling between the first set of electrically conductive current paths and the power source when the second hinge is in an unfolded configuration.

The third set of electrically conductive current paths may provide direct electrical coupling between the power source and the first set of electrically conductive current paths. The second set of electrically conductive current paths may provide direct electrical coupling between the first set of electrically conductive current paths and each of: the at least one processor, the non-transitory processor readable storage medium, and the light engine.

The first set of electrically conductive current paths may be electrically coupled to the second set of electrically conductive current paths by at least one coupling mechanism selected from a group consisting of: a board-to-board connector, solder, and adhesive, and the first set of electrically conductive current paths may be electrically coupled to the third set of electrically conductive current paths by at least one coupling mechanism selected from a group consisting of: a board-to-board connector, solder, and adhesive.

The WHUD may further comprise: a wireless communications module carried by the first arm; an antenna carried by the front frame; and a fifth set of electrically conductive current pathways that extend across the first hinge to provide electrical coupling between the antenna and the communications module.

The WHUD may further comprise: a wireless communications module carried by the first arm; and an antenna carried by the front frame, the antenna extending across the first hinge and electrically coupled to the communications module.

The WHUD may further comprise: a wireless communications module carried by the first arm; and an antenna carried by the first arm, the antenna electrically coupled to the communications module.

The light engine may comprise at least one component selected from a group consisting of: a projector, a scanning laser projector, a microdisplay, and a white-light source. The optical combiner may comprise at least one optical component selected from a group consisting of: a waveguide, a holographic optical element, a prism, a diffraction grating, a light reflector, a light reflector array, a light refractor, and a light refractor array. The optical combiner may be carried by a lens and the lens may be carried by the front frame of the support structure.

The optical combiner may comprise a waveguide, an incoupler, and an outcoupler, wherein: the incoupler is positioned and oriented to receive the display light output by the light engine when the first hinge is in the unfolded configuration and to redirect the display light into the waveguide; the waveguide is positioned and oriented to direct the display light to the outcoupler; and the outcoupler is positioned and oriented to redirect the display light out of the waveguide and towards the eye of the user when the support structure is worn on the head of the user.

The optical combiner may include at least one hologram, the light engine may be positioned and oriented to project the display light onto the at least one hologram when the first hinge is in the unfolded configuration, and the at least one hologram may be positioned and oriented to redirect the display light towards the eye of the user when the support structure is worn on the head of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
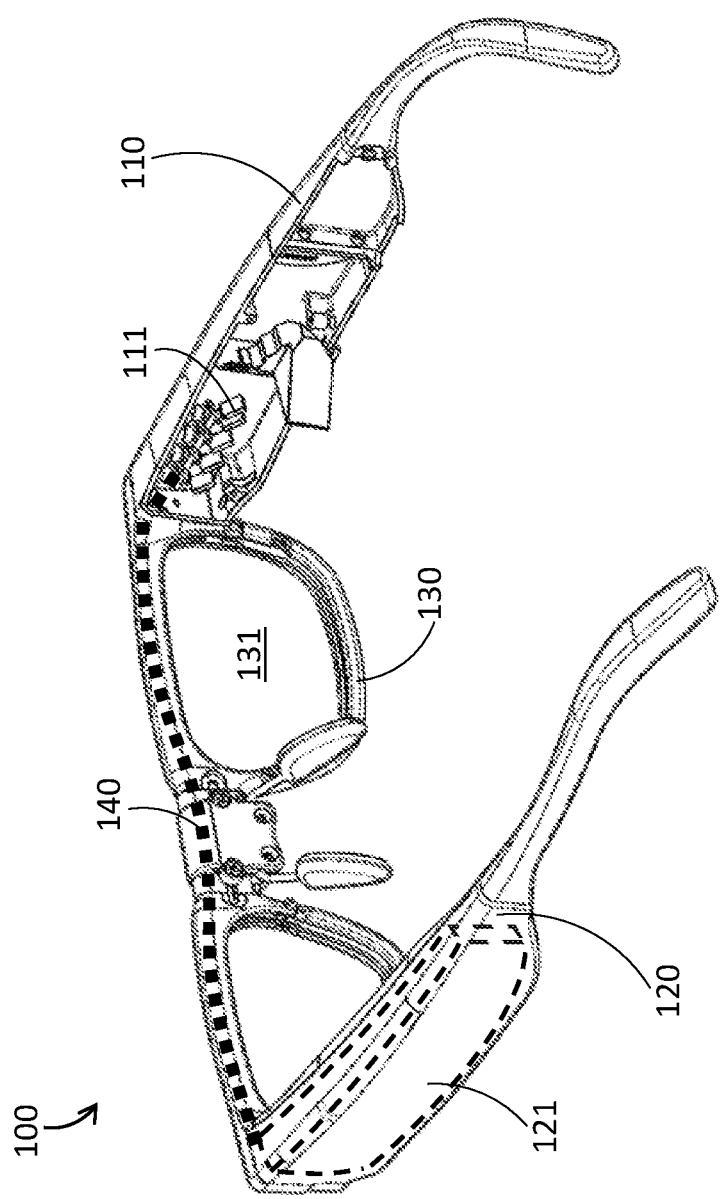
FIG. 1 is a partial-cutaway perspective diagram of an exemplary wearable heads-up display ("WHUD") in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for wearable heads-up displays which minimize bulk, achieve ergonomics and balance, enable folding, and improve manufacturability, while maintaining high performance of the wearable heads-up display. In wearable heads-up displays, there is typically a struggle to fit powerful technology and hardware in a device, while making the device small and light enough to be comfortable and aesthetically pleasing on a user's face. Typically, a wearable heads-up display will include some kind of display element, as well as a power source to power the display element. "Power source" as used herein can refer to a component which provides electrical power. This could include for example a source of stored power such as a battery, including a chemical battery or a mechanical battery, or could include power generation systems such as piezoelectric elements, solar cells, or similar. The hardware in the display element often requires bulky optics and light modules. Further, in order to achieve a reasonable operating time for the device, the power source typically will be bulky and heavy. Fitting these bulky and heavy components into a device the size of eyeglasses has proven to be a significant challenge, especially when considering that all of the components must not only fit in the device, but also must have balanced weight to prevent strain and discomfort to the user, should have balanced volume to achieve an aesthetically appealing symmetrical design, and should allow the device to fold or collapse for portability.

FIG. 1 is a partial-cutaway perspective diagram of an exemplary wearable heads-up display ("WHUD") 100 in accordance with the present systems, devices, and methods. WHUD 100 includes a first arm 110, a second arm 120, and a front frame 130 which is physically coupled to first arm 110 and second arm 120. When worn by a user, first arm 110 is to be positioned on a first side of a head of the user, second arm 120 is to be positioned on a second side of a head of a user opposite the first side of the head of the user, and front frame 130 is to be positioned on a front side of the head of a user. First arm 110 carries a light engine 111 which outputs light representative of display content to be viewed by a user. First arm 110 may also optionally carry several additional components of WHUD 100, as will be discussed in more detail later. Second arm 120 carries a power source 121 which powers the components of WHUD 100. Front frame 130 carries an optical combiner 131 in a field of view of the user which receives light output from the light engine 111 and redirects this light to form a display to be viewed by the user. Front frame 130 also carries at least one set of electrically conductive current paths 140 which provides electrical coupling between power source 121 and light engine 111, and other electrical components carried by first arm 110. A "set of electrically conductive current paths" as used herein can refer to a single electrically conductive current path, such as a wire or conductive trace on a printed circuit board, as well as a plurality of electrically conductive current paths, such as a plurality of wires or a plurality of conductive traces on a printed circuit board. Further, for a set of electrically conductive current paths to provide electrical coupling, at least one current path in the set can provide the coupling. It is possible, but not necessary, that a plurality or all of the electrically conductive current paths in the set provide the coupling. Further, for one set of electrically conductive current paths to provide electrical coupling to another set of electrically conductive current paths, at least one current path in the one set should couple to at least one current path in the other set. It is possible, but not necessary, for each electrically conductive current path in the one set to couple to a respective electrically conductive current path in the other set. It is also possible that either of the sets of electrically conductive current paths could act as fan-in or fan-out paths, in which the number of conductors in one set of electrically conductive current paths is greater or less than the number of conductors in the other set of electrically conductive current paths.

Light engine 111 and optical combiner 131 can include any appropriate display architecture for outputting light and redirecting the light to form a display to be viewed by a user. For example, light engine 111, and any of the light engines described herein, could include at least one component selected from a group comprising at least a projector, a scanning laser projector, a microdisplay, a white-light source, or any other display technology as appropriate for a given application. Optical combiner 131, and any of the optical combiners described herein, could include at least one optical component selected from a group comprising at least a waveguide, at least one holographic optical element, at least one prism, a diffraction grating, at least one light reflector, a light reflector array, at least one light refractor, a light refractor array, or any other light-redirection technology as appropriate for a given application, positioned and oriented to redirect the display light towards the eye of the user. Optical combiner 131 can be carried by a lens and the lens can be carried by front frame 130. For example, optical combiner 131 could be: a layer formed as part of a lens, a layer adhered to a lens, a layer embedded within a lens, a layer sandwiched between at least two lenses, or any other appropriate arrangement. A layer can for example be molded or cast, and/or could include a thin film and/or coating. Alternatively, optical combiner 131 could be a lens carried by front frame 130. Further, a "lens" as used herein can refer to a plano lens which applies no optical power and does not correct a user's vision, or a "lens" can be a prescription lens which applies an optical power to incoming light to correct a user's vision.

Exemplary display architectures could include for example scanning laser projector and holographic optical element combinations, side-illuminated optical waveguide displays, pin-light displays, or any other wearable heads-up display technology as appropriate for a given application. Exemplary display architectures are described in at least U.S. Non-Provisional patent application Ser. No. 15/145,576, U.S. Non-Provisional patent application Ser. No. 15/167,458, U.S. Non-Provisional patent application Ser. No. 15/046,254 now published as U.S. Pat. No. 9,989,764, U.S. Provisional Patent Application No. 62/754,339, U.S. Provisional Patent Application Ser. No. 62/782,918, U.S. Provisional Patent Application Ser. No. 62/789,908, US Provisional Patent Application Ser. No. 62/845,956, U.S. Provisional Patent Application Ser. No. 62/791,514, and U.S. Provisional Patent Application Ser. No. 61/928,568 (now U.S. Non-Provisional patent application Ser. No. 14/599,279).

Advantageously, by positioning a majority of electrical components in a first arm, and positioning a power source in a second arm, space can be utilized efficiently, which reduces overall bulk and volume of the WHUD. For example, if a smaller power source were carried by both the first arm and the second arm, each power source would require a separate housing, which occupies space. By having a unified power source carried by the second arm, and having the second arm largely or entirely devoted to carrying the power source, space occupied by the power source housing can be decreased, thus optimizing space efficiency of the WHUD, and enabling greater power source capacity and/or reduced bulk. Further, weight balance can be achieved by carefully selecting appropriate electrical and optical components to be carried by the first arm, to match the weight of the power source. By selecting components of appropriate size and weight, and/or by filling the first arm densely enough with components, the first arm and the second arm can be designed to have similar weight. If necessary, additional weight can be added to the first arm by selecting a denser or thicker housing material for the first arm, or by adding "ballast" material to the first arm, i.e. excess material included solely for the purpose of increasing the weight of the first arm to match the second arm. It is also possible to reduce the size of the power source in order to reduce the weight of the second arm to match the weight of the first arm. Further, it is also possible to adjust the form factor of the first arm and/or the second arm to achieve volume and/or weight balance for aesthetics and comfort. As an example, the components in the first arm may necessitate a certain shape for the first arm, and the second arm and power source shape can be designed to match the shape of the first arm. Similarly, a certain shape of the second arm may be required to house an adequate power source therein, and the first arm can be designed to have a certain shape to match the shape of the second arm, with the components in the first arm being selected and arranged to fit within the designed shape.

Several exemplary WHUDs are described below, which further illustrate various features of the present systems, devices, and methods. One skilled in the art will appreciate that the specific features described in the below implementations can be combined as appropriate, such that the present disclosure is not restricted to only the implementations discussed below, but also includes any reasonable combination of the features of the implementations discussed herein.

Figure 2A:
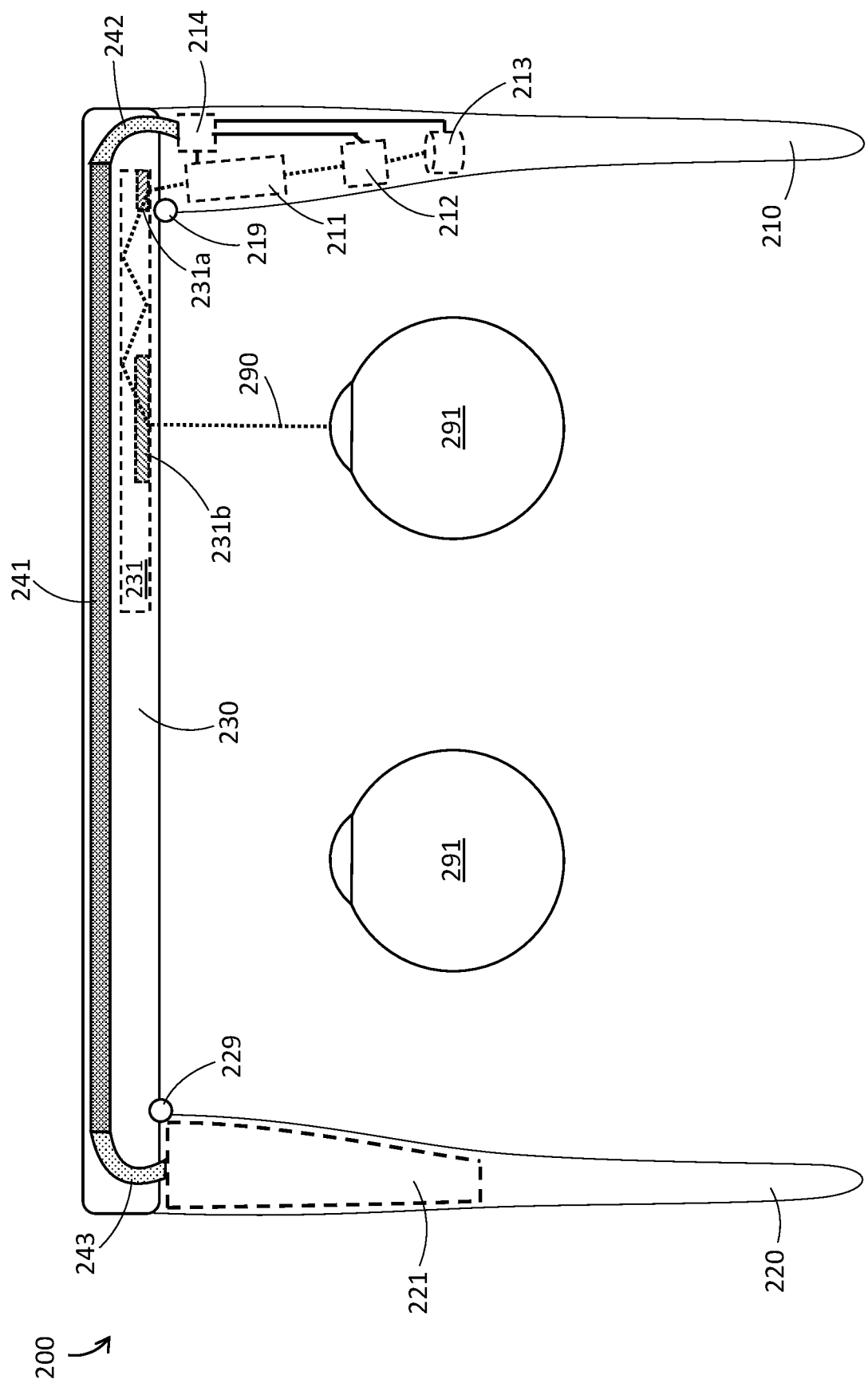
FIGS. 2A, 2B, and 2C are top schematic views of an exemplary WHUD in accordance with the present systems, devices, and methods.
Figure 2B:
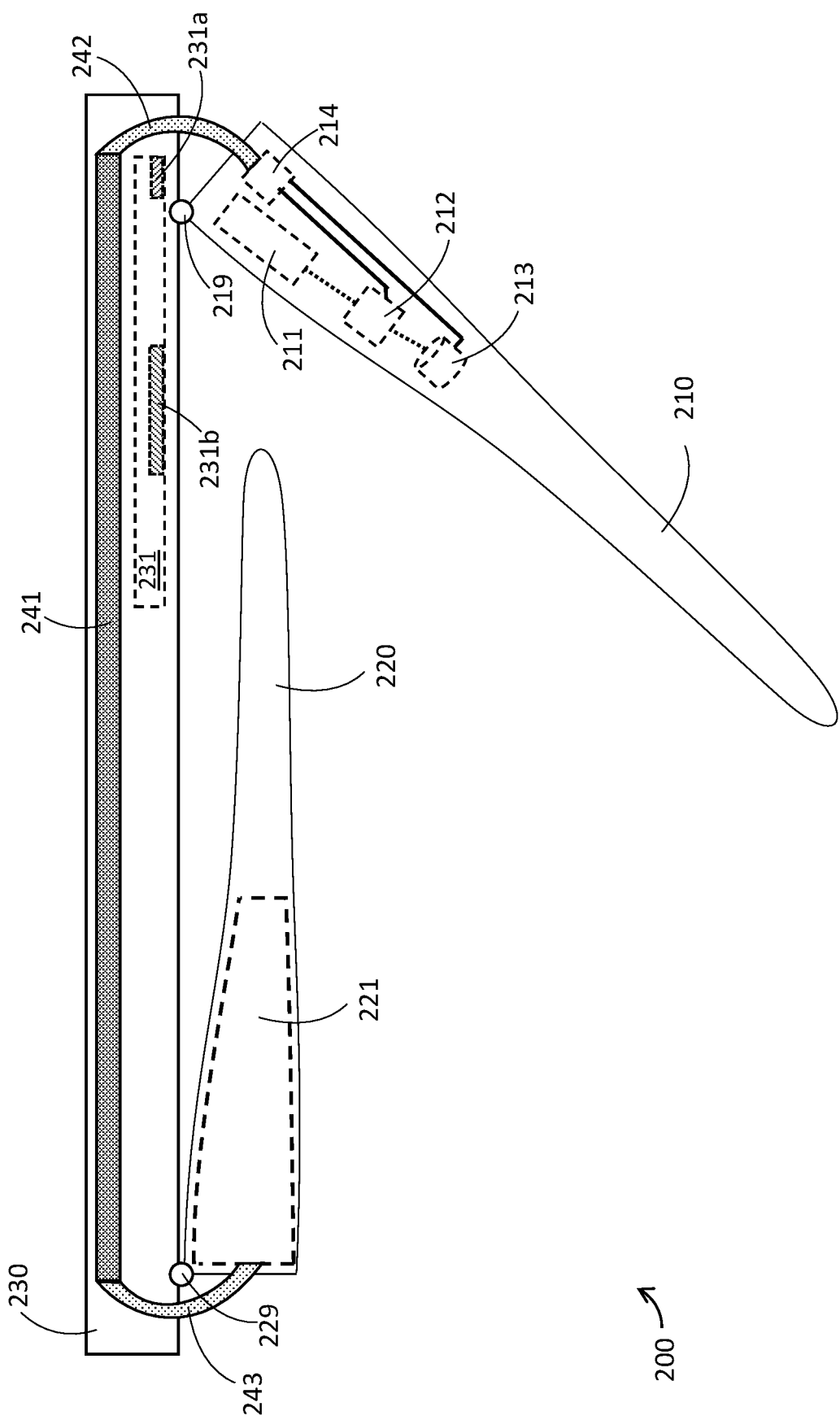
Figure 2C:
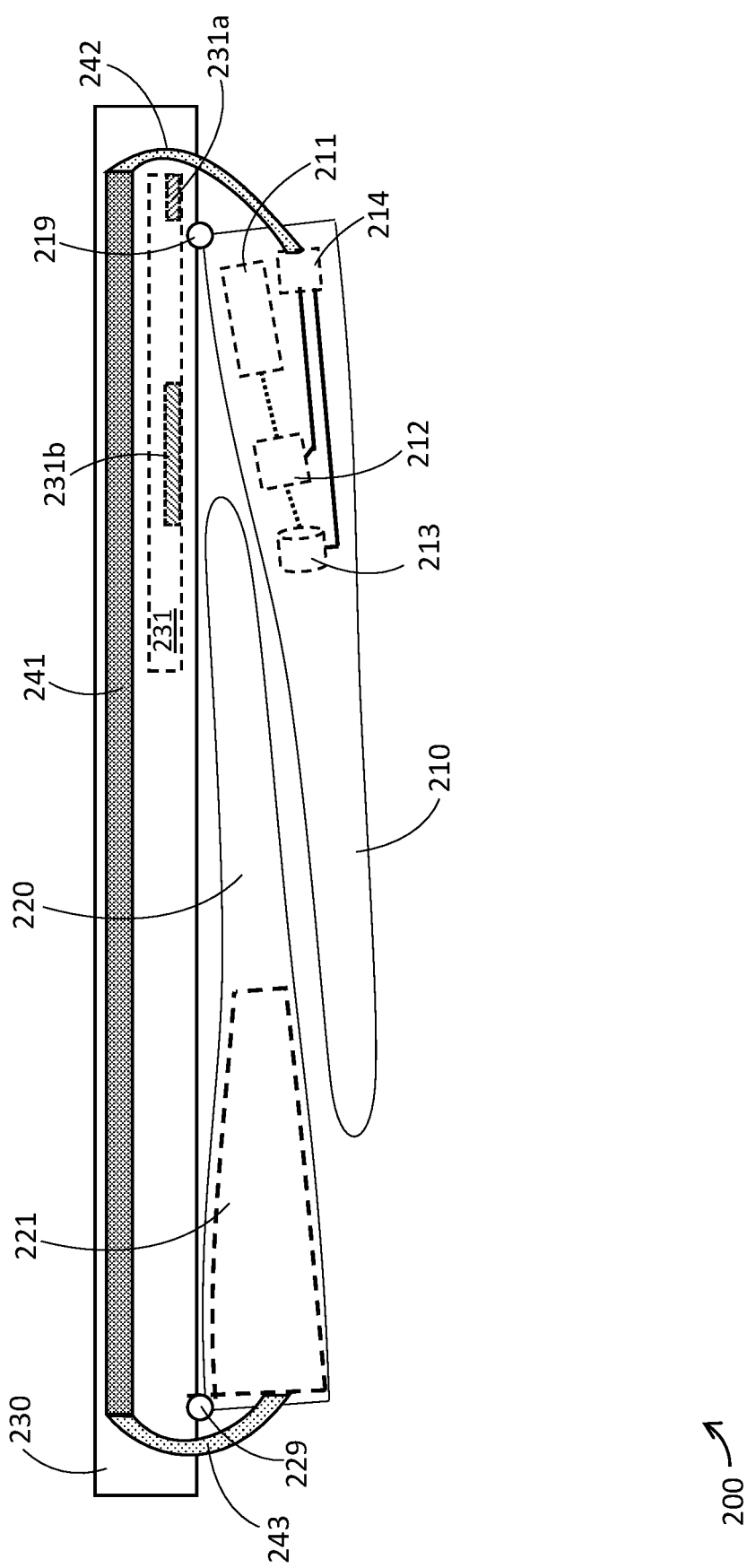

FIGS. 2A, 2B, and 2C are top schematic views of an exemplary WHUD 200 in accordance with the present systems, devices, and methods. Similar to WHUD 100, WHUD 200 includes a first arm 210, a second arm 220, and a front frame 230. First arm 210 is coupled to front frame 230 by hinge 219, which allows first arm 210 to rotate relative to front frame 230. Second arm 220 is coupled to front frame 230 by hinge 229, which allows second arm 220 to rotate relative to front frame 230. FIG. 2A illustrates WHUD 200 in an open configuration, in which first arm 210 and second arm 220 are rotated such that WHUD 200 can be worn on a head of a user, with first arm 210 positioned on a first side of the head of the user, second arm 220 positioned on a second side of the head of the user opposite the first side, and front frame 230 positioned on a front side of the head of the user. FIG. 2B illustrates WHUD 200 in a partial-folded configuration, in which first arm 210 and second arm 220 are rotated towards WHUD 200 being in a compact configuration optimal for size reduction and portability of WHUD 200 when not in use. FIG. 2B illustrates a "partial-folded" configuration in the sense that first arm 210 is shown as being partway between the open configuration and a fully folded configuration. This is to better illustrate the hinging action of WHUD 200. This is to better illustrate the hinging action of WHUD 200. FIG. 2C illustrates WHUD 200 in a folded configuration, in which both first arm 210 and second arm 220 can be folded to be approximately parallel to front frame 230, such that WHUD 200 will be in a compact shape which fits conveniently in a slim rectangular, cylindrical, or oblong case.

First arm 210 carries light engine 211, at least one processor 212, non-transitory processor-readable storage medium 213, and power supply circuit 214. Second arm 220 carries power source 221. Front frame 230 carries optical combiner 231 and at least a first set of electrically conductive current paths 241. A second set of electrically conductive current paths 242 extends across first hinge 219 and provides electrical coupling between first set of electrically conductive current paths 241 and power supply circuit 214. A third set of electrically conductive current paths 243 extends across hinge 229 and provides electrical coupling between power source 221 and first set of electrically conductive current paths 241, either directly or through a power supply circuit coupled to power source 221 in second arm 220. The electrical connections between electrically conductive current pathways described herein, including at least the connection between the first set of electrically conductive current paths 241 and the second set of electrically conductive current paths 242, and the connection between the first set of electrically conductive current paths 241 and the third set of electrically conductive current paths 243, could include connecting the respective sets of electrically conductive current paths using at least one of a board-to-board connector, solder, or adhesive, as examples. Example connections are described later with reference to FIGS. 11A-11C.

The set of electrically conductive current paths 242 and the set of electrically conductive current paths 243 should be flexible, so as to not interfere with rotation of first arm 210 and second arm 220 relative to front frame 230. Over the lifetime of WHUD 200, WHUD 200 can be expected to be repeatedly changed between the open configuration and the folded configuration. Consequently, the set of electrically conductive current paths 242 and the set of electrically conductive current paths 243 should be "dynamic".

In the present specification, "dynamic" in the context of electrical pathways, cables, and wires refers to the pathway, cable, or wire being able to endure repeated flexing, bending, torsion, or other stresses applied due to movement. On the other hand, "non-dynamic" in the context of electrical pathways, cables, and wires refers to the pathway, cable, or wire being unable to endure repeated flexing, bending, torsion, or other stresses. A non-dynamic electrical pathway is not necessarily inflexible; rather, a non-dynamic electrical pathway may refer to a pathway which is flexible, but can only endure a limited number of flexes before becoming damaged or broken. As examples, a dynamic electrical pathway may be able to endure approximately 7000 flexes, approximately 7200 flexes, or approximately 10000 flexes before becoming damaged, whereas a non-dynamic electrical pathway may only be able to endure 0 flexes, approximately 3 flexes, approximately 5 flexes, or approximately 10 flexes before becoming damaged. One skilled in the art will appreciate that these flex numbers are merely exemplary, and that the extent of how dynamic each electrical pathway is can be chosen based on a specific application.

One option for making an electrical pathway more dynamic is to decrease the thickness of the electrical pathway. In one example, the set of electrically conductive current paths 241, the set of electrically conductive current paths 242, and the set of electrically conductive current paths 243 could be formed as a single thin, flexible, dynamic set of electrically conductive current paths. However, a thin conductor will have greater electrical impedance than a thicker conductor. As a result, if the set of electrically conductive current paths 241, the set of electrically conductive current paths 242, and the set of electrically conductive current paths 243 are formed as a single thin dynamic set of electrically conductive current paths, the electrical path between power source 221 and the electrical components of WHUD 200 will have high impedance. This will increase lost power, and thus will reduce effective operating time of the device and/or will result in a larger power source being needed to power the device, both of which are undesirable.

On the other hand, one way to decrease the impedance of a conductor is to make the conductor thicker. However, this will reduce how dynamic the conductor is, thus reducing the lifespan of portions of the conductor which undergo repeated motion.

The present systems and devices address the above issues. As can be seen in FIGS. 2A-2C, the set of electrically conductive current paths 241, the set of electrically conductive current paths 242, and the set of electrically conductive current paths 243 can be formed as separate sets of electrically conductive current paths, which are then connected together in WHUD 200. The set of electrically conductive current paths 241 is carried by the front frame 230, which does not repeatedly undergo change or rotation; as such the set of electrically conductive current paths 241 can be formed as a low-impedance non-dynamic set of electrically conductive current paths. On the other hand, the set of electrically conductive current paths 242 and the set of electrically conductive current paths 243, which undergo repeated flexing, can be formed as dynamic sets of electrically conductive current paths. By using three different sets of electrically conductive current paths in this manner, dynamic flexibility of electrically conductive current paths which span hinge 219 and hinge 229 can be achieved, but relatively low impedance can also be attained by using a non-dynamic set of electrically conductive current paths across the front frame 230 where repeated flexibility is not needed.

The set of electrically conductive current paths 241 can be formed as a flexible, non-dynamic set of electrically conductive current paths which can endure the stress of at least one flex without being damaged, such that the set of electrically conductive current paths 241 can be installed in front frame 230 during assembly of WHUD 200. Alternatively, the set of electrically conductive current paths 241 can be formed as a rigid set of electrically conductive current paths which is embedded in front frame 230 during assembly. The set of electrically conductive current paths 241 can be formed as a flexible or rigid printed circuit board connector. The set of electrically conductive current paths 241 can be formed as at least one flexible or rigid wire. The set of electrically conductive current paths 242 and the set of electrically conductive current paths 243 could each be formed as a dynamic flexible printed circuit board, or could each be at least one dynamic flexible wire.

Power supply circuit 214 provides power from power source 221 to each of light engine 211, at least one processor 212, and non-transitory processor-readable storage medium 213, and any other electrical components that may be carried by first arm 210, as shown by solid lines connecting power supply circuit 214 to other components. In this way, the respective sets of electrically conductive current paths 241, 242, and 243 together provide electrical coupling between power source 221 and each of light engine 211, at least one processor 212, and non-transitory processor-readable storage medium 213, and other electrical components that may be carried by first arm 210, via power supply circuit 214. Power supply circuit 214 can optionally modulate the power from power source 221, such as by modulating the voltage or current of the power to be delivered to each of the electrical components. Each electrical component may receive the same modulated power signal from power supply circuit 214, each component may receive a different modulated power signal from power supply circuit 214, or some components may receive the same modulated power signal from power supply circuit 214 while other components receive a different modulated power signal from power supply circuit 214.

In some implementations, it is possible that when WHUD 200 is not in the unfolded configuration, the electrical coupling between power source 221 and the electrical components in first arm 210 can be disconnected. For example, WHUD 200 could include a safety switch which disconnects or disables the provision of power from power supply 221. As another example, at least one of the set of electrically conductive current paths 241, the set of electrically conductive current paths 242, or the set of electrically conductive current paths 243 can be physically disconnected from the other electrically conductive current paths, electrical components, or power source 221 when WHUD 200 is not in the unfolded configuration. In this way, the second set of electrically conductive current paths 242 can provide electrical coupling between the first set of electrically conductive current paths 241 and the light engine 211 when the first hinge 219 is in the unfolded configuration. Similarly, the third set of electrically conductive current paths 243 can provide electrical coupling between the first set of electrically conductive current paths 241 and the power source 221 when the second hinge 229 is in the unfolded configuration.

The at least one processor 212 can be communicatively coupled to each of the electrical components in WHUD 200 as shown by dashed lines connecting components, including but not limited to light engine 211, non-transitory processor readable storage medium 213, and power supply circuit 214. The at least one processor 212 can be any suitable component which can execute instructions or logic, including but not limited to a micro-controller, microprocessor, multi-core processor, integrated-circuit, ASIC, FPGA, programmable logic device, or any appropriate combination of these components. Non-transitory processor-readable storage medium 213 may store processor readable instructions thereon, which when executed by at least one processor 212 can cause light engine 211 to output light 290 representative of display content to be viewed by a user. The output light 290 representative of display content to be viewed by a user is redirected by optical combiner 231 towards an eye 291 of the user, such that the user can see the display content. In the case of WHUD 200, optical combiner 231 is a waveguide combiner which includes an incoupler 231a and an outcoupler 231b. Light 290 from light engine 211 impinges on incoupler 231a and is redirected into waveguide combiner 231, where the light 290 is guided through the waveguide by total internal reflection. Subsequently, light 290 in waveguide combiner 231 impinges on outcoupler 231b, which redirects light 290 out of the waveguide and towards an eye 291 of a user. One skilled in the art will appreciate that waveguide combiner 231 is an exemplary display architecture, and the present systems, devices, and methods are not limited to this display architecture as will be discussed later. Exemplary waveguide and lightguide based WHUD display architectures are described in at least U.S. Provisional Patent Application No. 62/754,339, U.S. Provisional Patent Application Ser. No. 62/782,918, U.S. Provisional Patent Application Ser. No. 62/789,908, US Provisional Patent Application Ser. No. 62/845,956, and U.S. Provisional Patent Application Ser. No. 62/791,514.

Further, non-transitory processor-readable storage medium 213 may store processor readable instructions thereon, which when executed by at least one processor 212 can cause the at least one processor to execute any number of functions, including receiving user input, managing user interfaces, generating display content to be presented to a user, receiving and managing data from any sensors carried by WHUD 200, receiving and processing external data and messages, and/or any other functions as appropriate for a given application. The non-transitory processor-readable storage medium 213 can be any suitable component which can store instructions, logic, or programs, including but not limited to non-volatile or volatile memory, read only memory (ROM), random access memory (RAM), FLASH memory, registers, magnetic hard disk, optical disk, or any combination of these components.

Figure 3:
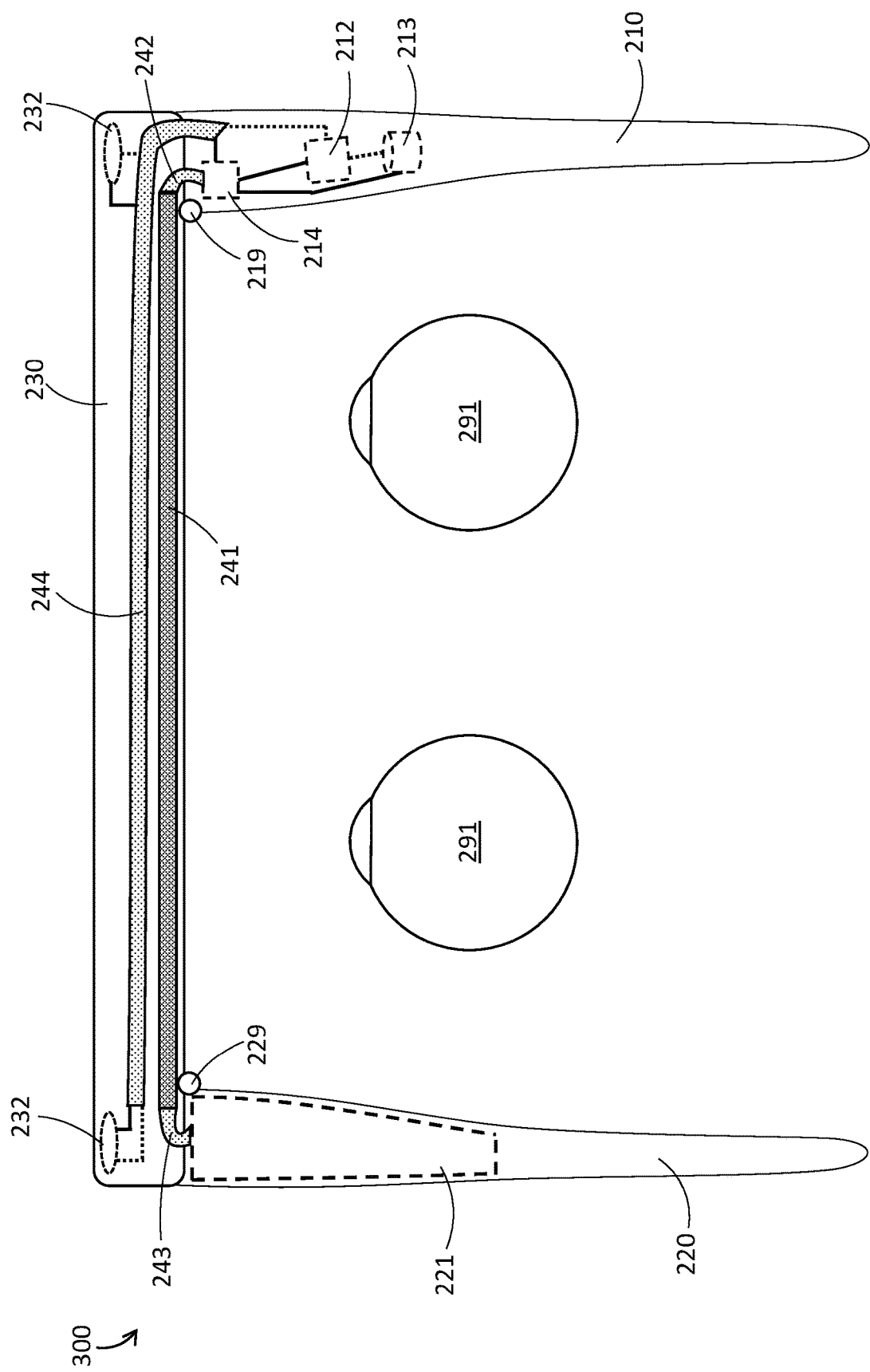
FIG. 3 is a top schematic view of another exemplary WHUD in accordance with the present systems, devices, and methods.

FIG. 3 is a top schematic view of a WHUD 300. WHUD 300 can be similar in at least some respects to WHUD 200 of FIGS. 2A-2C. Unless context clearly dictates otherwise, the description relating to components of WHUD 200 can be applicable to similarly numbered components of WHUD 300. Further, WHUD 300 does not show a light engine or display optics, in order to avoid clutter and to more clearly show the discussed features of WHUD 300. However, one skilled in the art will appreciate that WHUD 300 could include any of the display architectures discussed herein, such as light engine 211 and waveguide combiner 231 discussed with reference to FIGS. 2A-2C, or light engine 1011 and holographic combiner 1031 discussed with reference to FIG. 10. Further, WHUD 300 can transition between a folded configuration and an unfolded configuration similarly to WHUD 200 as illustrated in FIGS. 2A-2C.

One difference between WHUD 300 and WHUD 200 is that WHUD 300 includes at least one camera 232. FIG. 3 illustrates two cameras 232 on opposite ends of front frame 230, but one skilled in the art will appreciate that the exact number of cameras, and the specific position of the cameras, could be chosen as appropriate for a given WHUD design. For example, WHUD 300 could include only a single camera, or could include two, three, four, five, six, or more cameras. Further, although the at least one camera 232 is shown as being carried by front frame, at least one of cameras 232 could be carried by first arm 210 or second arm 220.

WHUD 300 can include a set of electrically conductive current paths 244 coupled to the at least one camera 232. As shown by solid lines in FIG. 3, the set of electrically conductive current paths 244 can also extend across hinge 219 between power supply circuit 214 and camera 232 to provide power to the camera 232. Further, as shown by dashed lines, the set of electrically conductive current paths 244 can also extend across hinge 219 between processor 212 and camera 232, so that processor 212 can control camera 232, and so that camera 232 can provide captured visual data to processor 212. Since the set of electrically conductive current paths 244 can act as a transmission medium for both power and data, the set of electrically conductive current paths 244 can include at least two conductors, one for power, and one for data. For example, the set of electrically conductive current paths 244 could comprise a flexible printed circuit board including at least two conductive traces. Alternatively, the set of electrically conductive current paths 244 could include at least two separate wires.

Similar to the set of electrically conductive current paths 242 and the set of electrically conductive current paths 243, the set of electrically conductive current paths 244 can be flexible and dynamic, so as to not interfere with rotation of first arm 210 about hinge 219. In this regard, the set of electrically conductive current paths 244 could be formed as a continuous dynamic set of electrically conductive current paths which runs from first arm 210, across hinge 219, and through front frame 230. Since the set of electrically conductive current paths 244 needs only to transmit signals to and from at least one camera 232, the impedance over a continuous thin dynamic set of electrically conductive current paths may be acceptable. On the other hand, the set of electrically conductive current paths 244 could comprise at least two sets of electrically conductive current paths: a dynamic set of electrically conductive current paths which spans across hinge 219, coupled to a non-dynamic set of electrically conductive current paths which travels through front frame 230 to camera 232. Such an arrangement would advantageously maintain a flexible and dynamic set of electrically conductive current paths across hinge 219, while also optimizing impedance of signals traveling to and from camera 232.

Further, a flexible, dynamic portion of the set of electrically conductive current paths 244 may overlap with the set of electrically conductive current paths 242 across hinge 219, such that the set of electrically conductive current paths 244 and the set of electrically conductive current paths 242 flex together. This concept is discussed in more detail later with reference to FIG. 12C.

Figure 4:
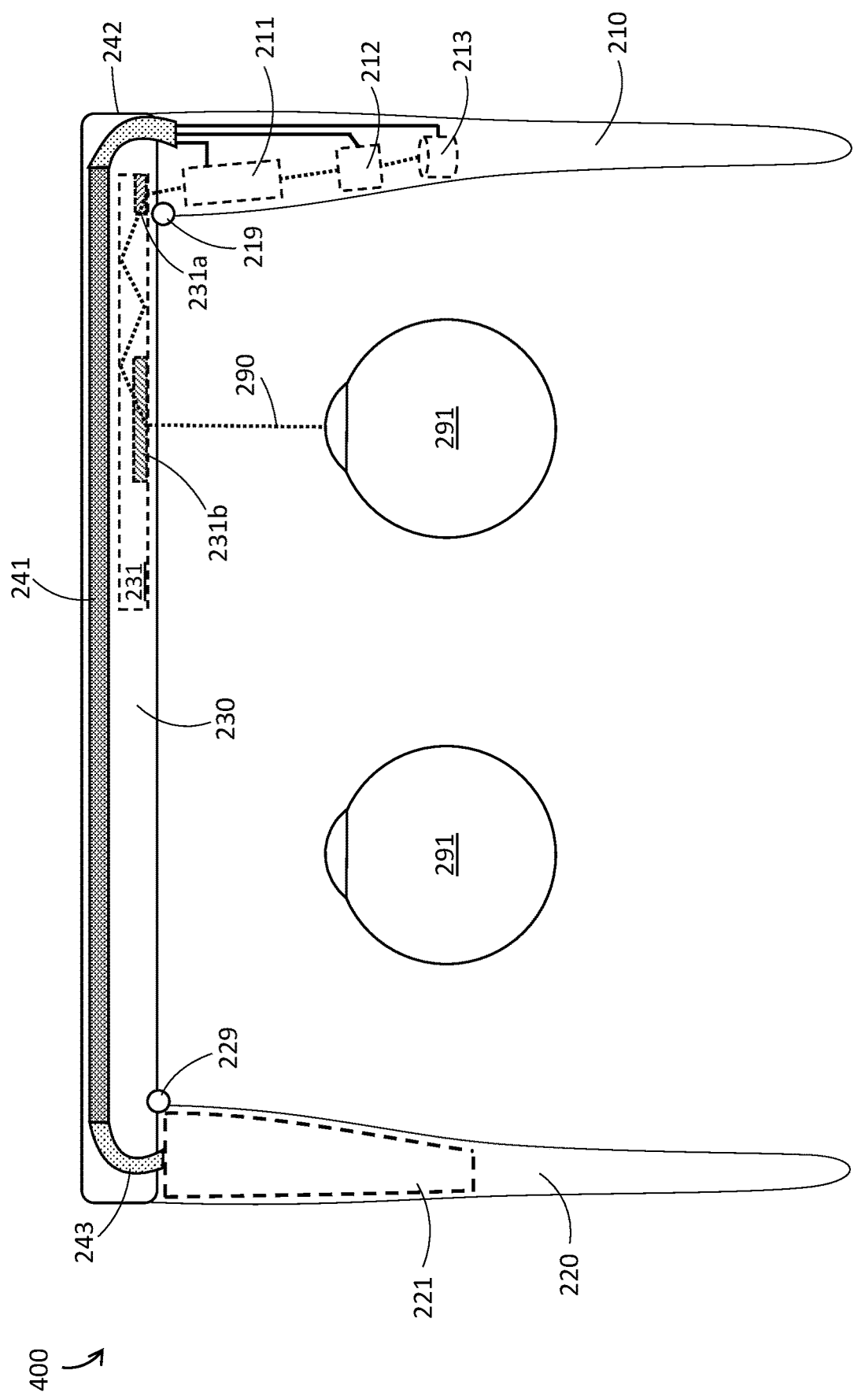
FIG. 4 is a top schematic view of yet another exemplary WHUD in accordance with the present systems, devices, and methods.

FIG. 4 is a top schematic view of a WHUD 400. WHUD 400 can be similar in at least some respects to WHUD 200 of FIGS. 2A-2C. Unless context clearly dictates otherwise, the description relating to components of WHUD 200 can be applicable to similarly numbered components of WHUD 400. Further, WHUD 400 can transition between a folded configuration and an unfolded configuration similarly to WHUD 200 as illustrated in FIGS. 2A-2C.

One difference between WHUD 400 and WHUD 200 is that in WHUD 400, first arm 210 does not include power supply circuit 214. Instead, each of the set of electrically conductive current paths 241, the set of electrically conductive current paths 242, and the set of electrically conductive current paths 243 can include respective conductors which connect a respective component in first arm 210 to power from the power source 221 in second arm 220. The set of electrically conductive current paths 242 may include a respective conductor or set of conductors for each electrical component in first arm 210, such that each conductor in the set of electrically conductive current paths 242 directly connects to a respective electrical component in first arm 210. The set of electrically conductive current paths 243 may be directly coupled to power source 221, or may be coupled to a power supply circuit carried in second arm 220 with power source 221.

Figure 5:
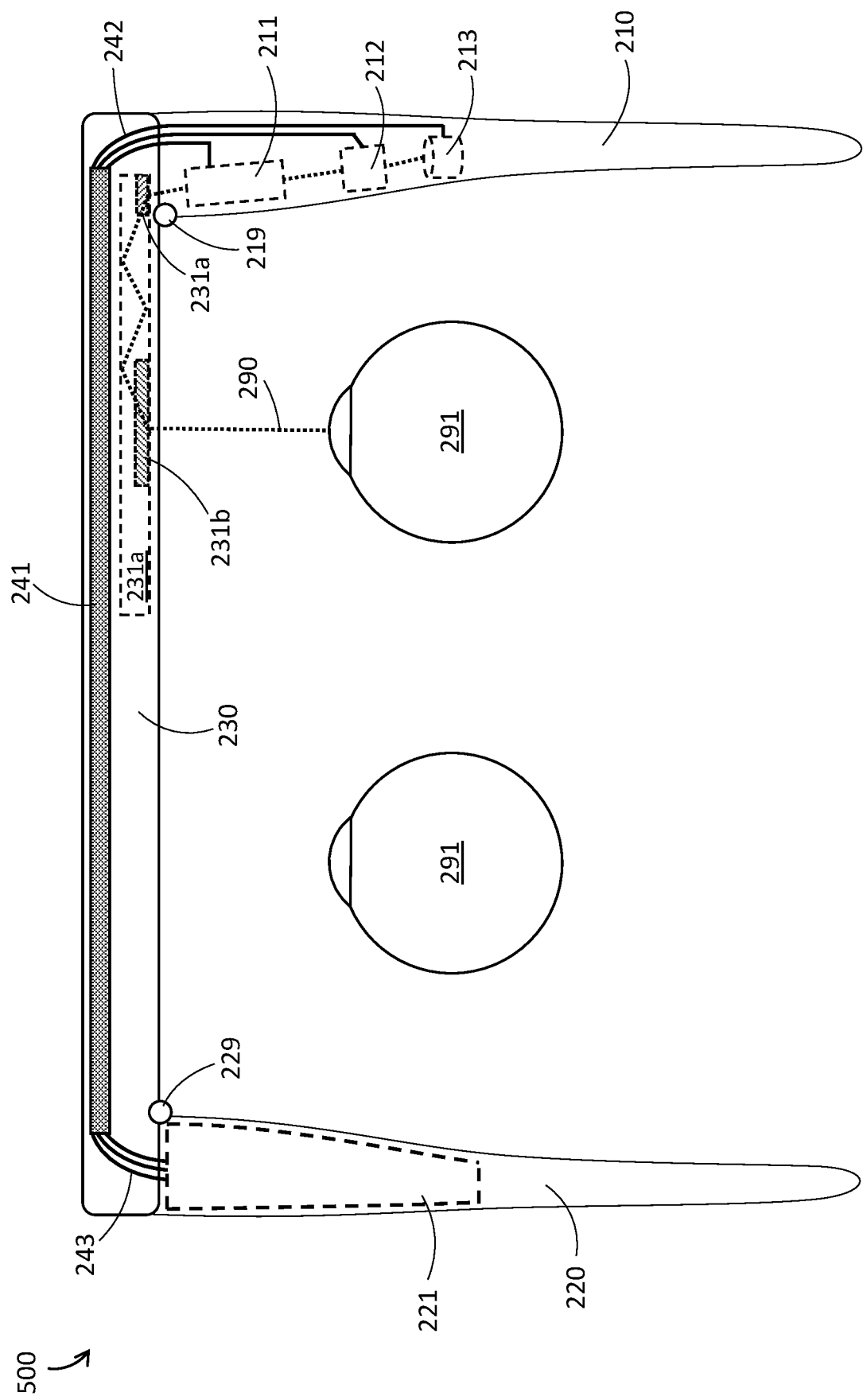
FIG. 5 is a top schematic view of yet another exemplary WHUD in accordance with the present systems, devices, and methods.

FIG. 5 is a top schematic view of a WHUD 500. WHUD 500 can be similar in at least some respects to WHUD 200 of FIGS. 2A-2C. Unless context clearly dictates otherwise, the description relating to components of WHUD 200 can be applicable to similarly numbered components of WHUD 500. Further, WHUD 500 can transition between a folded configuration and an unfolded configuration similarly to WHUD 200 as illustrated in FIGS. 2A-2C.

One difference between WHUD 500 and WHUD 200 is that in WHUD 500, the set of electrically conductive current paths 242 and the set of electrically conductive current paths 243 are shown as a plurality of separate conductors. For example, this could include each of the set of electrically conductive current paths 242 and the set of electrically conductive current paths 243 being a dynamic flexible printed circuit board having a plurality of conductive traces therein. Alternatively, each of the set of electrically conductive current paths 242 and the set of electrically conductive current paths 243 could comprise a plurality of dynamic wires.

Further, FIG. 5 shows first arm 210 of WHUD 500 as not including a power supply circuit 214, similarly to WHUD 400 of FIG. 4. In such an implementation, each of the electrical components can receive power directly from power source 221, or a power supply carried in second arm 220. However, WHUD 500 could also include a power supply 214 in first arm 210, which receives power from power source 221 through a plurality of conductors as illustrated in FIG. 5.

Further still, although not explicitly illustrated in FIG. 5, the set of electrically conductive current paths 241 can also include a plurality of conductors similar to the set of electrically conductive current paths 241 and the set of electrically conductive current paths 242. In one exemplary implementation, each of the set of electrically conductive current paths 241, the set of electrically conductive current paths 242, and the set of electrically conductive current paths 243 could include an equal, plural number of conductors. In other implementations the set of electrically conductive current paths 242 and/or the set of electrically conductive current paths 243 could act as fan-in or fan-out electrically conductive current paths, in which the number of conductors in the set of electrically conductive current paths 242 or the set of electrically conductive current paths 243 is greater or less than the number of conductors in the set of electrically conductive current paths 241.

Figure 6A:
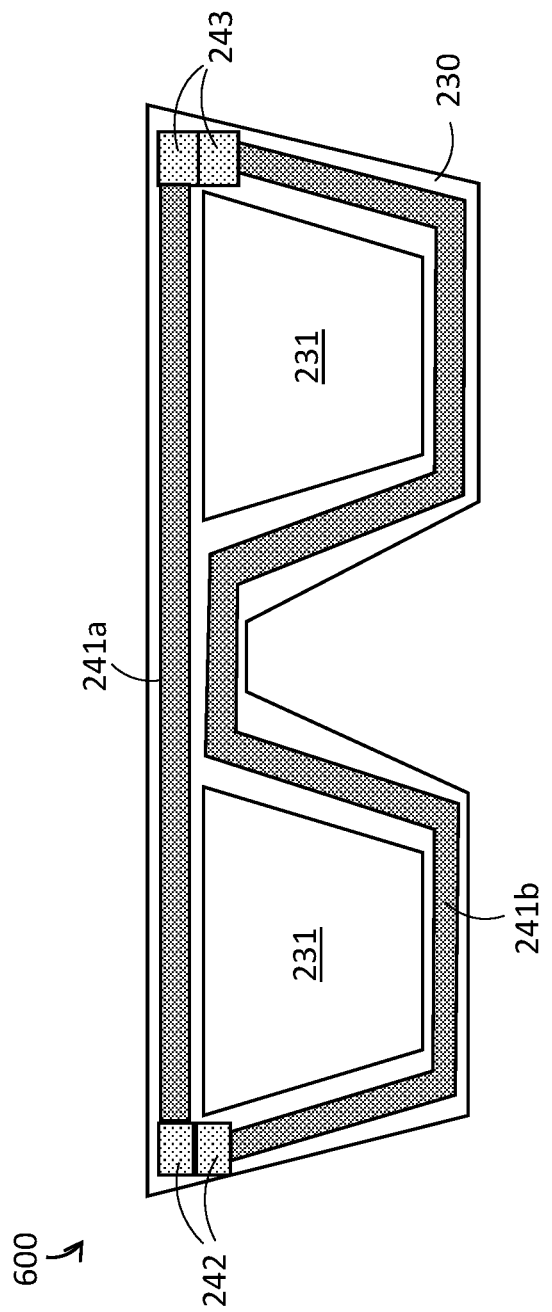
FIG. 6A is a front-view of yet another exemplary WHUD in accordance with the present systems, devices, and methods.

FIG. 6A is a front-view of a WHUD 600, which can include any of the features of the above-discussed WHUDs. Unless context clearly dictates otherwise, the description relating to components of WHUD 200 can be applicable to similarly numbered components of WHUD 600. FIG. 6A illustrates an implementation in which the set of electrically conductive current paths 241 includes at least two sets of electrically conductive current paths 241a and 241b which run across front frame 230. The set of electrically conductive current paths 241a may run along the top of front frame 230, and the set of electrically conductive current paths 241b may run along the bottom of front frame 230. In this way, the design of front frames 230 can be made to have thinner lens rims, by spreading the thickness of the set of electrically conductive current paths 241 across two different areas of front frame 230.

Each of the set of electrically conductive current paths 241a and the set of electrically conductive current paths 241b can be connected to the dynamic set of electrically conductive current paths 242 and the dynamic set of electrically conductive current paths 243 as detailed in the above implementations. In the case of WHUD 600 illustrated in FIG. 6A, the set of electrically conductive current paths 241a may couple to a first portion of the set of electrically conductive current paths 242 and a first portion of the set of electrically conductive current paths 243, whereas the set of electrically conductive current paths 241b may couple to a second portion of the set of electrically conductive current paths 242 and a second portion of the set of electrically conductive current paths 243. In other implementations, each of the set of electrically conductive current paths 242 and the set of electrically conductive current paths 243 may include a respective connector which couples to the set of electrically conductive current paths 241a and a respective connector which couples to the set of electrically conductive current paths 241b. In yet other implementations, the set of electrically conductive current paths 242 and/or the set of electrically conductive current paths 243 may be fan-in or fan-out paths as discussed above with reference to FIG. 5.

In other implementations, the set of electrically conductive current paths 241 may include a single set of electrically conductive current paths which extend together through front frame 230. For example, the set of electrically conductive current paths could include only the set of conductive current paths 241a, or only the set of conductive current paths 241b.

Different users can have different head size and geometry, and consequently may require different size WHUD frames. For example, a user with a wide head may require a wide front frame 230, whereas a user with a narrow head may require a narrow front frame 230. Further, users may desire different styles or sizes of frames for aesthetic purposes. It is desirable to provide such different sizes and styles to users. However, to reduce manufacturing burden and simplify inventory management, it is generally desirable to minimize the number of different components required in order to accommodate different size and style WHUDs. To this end, it is desirable to be able to use a limited number of sizes (or even a single size) of the set of electrically conductive current paths 241 for multiple sizes of front frame 230. Exemplary implementations to achieve this are discussed below with reference to FIGS. 6B and 6C.

Figure 6B:
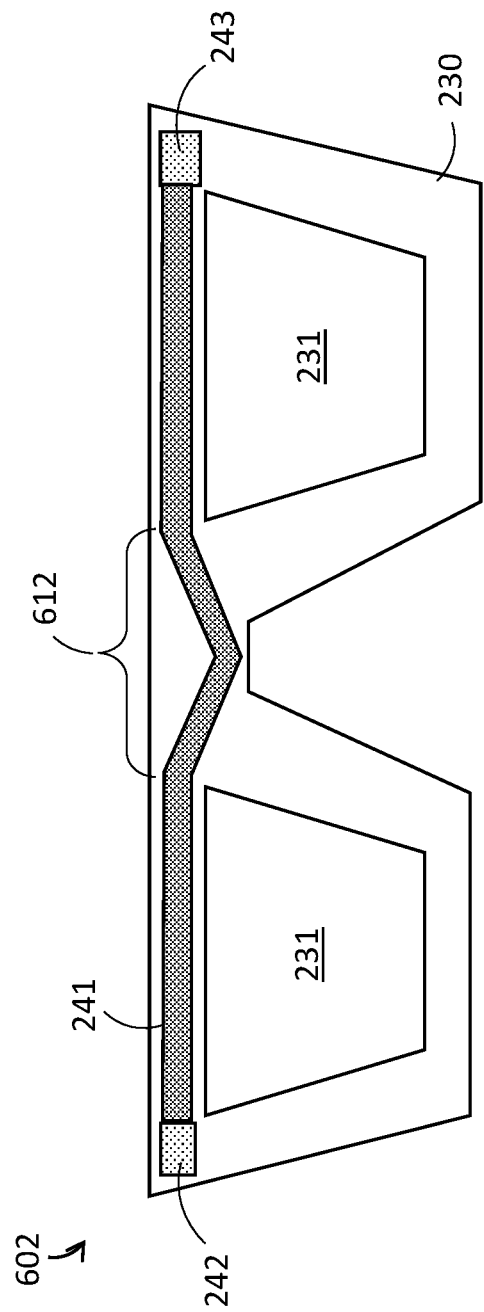
FIG. 6B is a front-view of yet another exemplary WHUD in accordance with the present systems, devices, and methods.

FIG. 6B is a front-view of a WHUD 602, which can include any of the features of the above-discussed WHUDs. Unless context clearly dictates otherwise, the description relating to components of WHUD 600 can be applicable to similarly numbered components of WHUD 602. FIG. 6B illustrates an implementation in which the set of electrically conductive current paths 241 runs along the top of front frame 230. The set of electrically conductive current paths 241 can be sized to extend between the set of electrically conductive current paths 242 and the set of electrically conductive current paths 243 for a large-sized front frame 230. For such a large-sized front frame, the set of electrically conductive current paths 241 can extend across front frame 230 along the shortest path. Such a path could be similar to the path of the set of electrically conductive current paths 241a in FIG. 6A: straight across (or as close to straight as front frame 230 will allow, as some front frames may feature curved geometry).

WHUD 602 in FIG. 6B has a medium-sized front frame 230. Consequently, the set of electrically conductive current paths 241 may be longer than needed for WHUD 602. However, front frame 230 of WHUD 602 can be designed to fit the extra length of the set of electrically conductive current paths 241. For example, FIG. 6B shows an accommodation region 612, where the set of electrically conductive current paths 241 may take a path which is not the shortest possible path between the set of electrically conductive current paths 242 and the set of electrically conductive current paths 243. The accommodation region 612 could for example be a cavity in front frame 230 which provides extra room for the set of electrically conductive current paths 241 to bend, fold, or deflect. In some implementations, the accommodation region 612 could be a slot or physical pathway which itself bends or deflects, such that the set of electrically conductive pathways can be positioned within the slot or physical pathway.

Figure 6C:
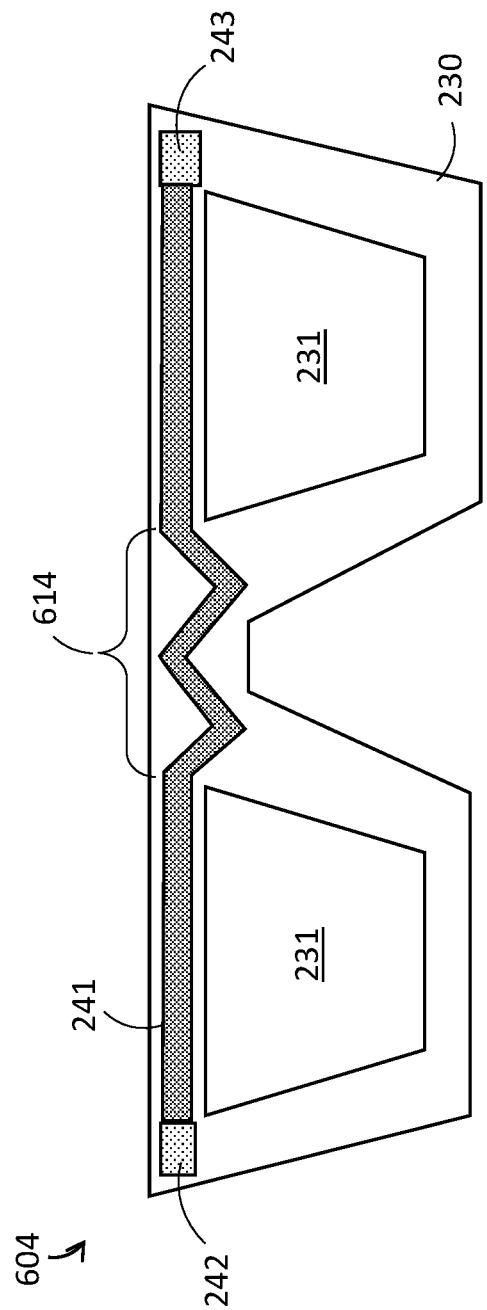
FIG. 6C is a front-view of yet another exemplary WHUD in accordance with the present systems, devices, and methods.

FIG. 6C is a front-view of a WHUD 604, which can include any of the features of the above-discussed WHUDs. Unless context clearly dictates otherwise, the description relating to components of WHUD 600 and WHUD 602 can be applicable to similarly numbered components of WHUD 604. FIG. 6C illustrates an implementation in which the set of electrically conductive current paths 241 runs along the top of front frame 230. Similar to FIG. 6B, the set of electrically conductive current paths 241 can be sized to extend between the set of electrically conductive current paths 242 and the set of electrically conductive current paths 243 for a large-sized front frame 230. However, WHUD 604 in FIG. 6C has a small-sized front frame 230. Consequently, the set of electrically conductive current paths 241 may be much longer than needed for WHUD 604. However, front frame 230 of WHUD 604 can be designed to fit the extra length of the set of electrically conductive current paths 241. FIG. 6C shows an accommodation region 614, where the set of electrically conductive current paths 241 may take a path which is not the shortest possible path between the set of electrically conductive current paths 242 and the set of electrically conductive current paths 243. Similar to FIG. 6B, the accommodation region 614 could for example be a cavity in front frame 230 which provides extra room for the set of electrically conductive current paths 241 to bend, fold, or deflect; or the accommodation region 614 could be a slot or physical pathway which itself bends or deflects, such that the set of electrically conductive pathways can be positioned within the slot or physical pathway. Compared to FIG. 6B, the set of electrical pathways 241 will take an even less direct physical pathway in FIG. 6C, bending or deflecting multiple times.

In view of the above, a limited number of sizes (or a single size) of a set of electrical pathways could be used in multiple different sizes of WHUDs, thereby reducing manufacturing burden and simplifying inventory management. In the examples of FIGS. 6B and 6C, the set of electrical pathways 241 is shown as bending or deflecting in a nose-bridge region of front frame 230. However, in some implementations the accommodation region may be positioned elsewhere, such as near the temples (sides where supporting arms connect) of front frame 230, or along an entire width of front frame 230. Further, the bends of the set of electrically conductive pathways 241 in FIGS. 6B and 6C are shown as sharp, but in other implementations the set of electrically pathways may follow curved paths, bends, or deflections.

The techniques described above with reference to FIGS. 6B and 6C regarding using a limited number of sizes of a set of electrical pathways for different sizes or shapes of a WHUD also apply to other sets of electrical pathways, including for example set of electrical pathways 244, set of electrical pathways 242, set of electrical pathways 243, set of electrical pathways 241a, set of electrical pathways 241b, and antenna 233a.

Figure 7:
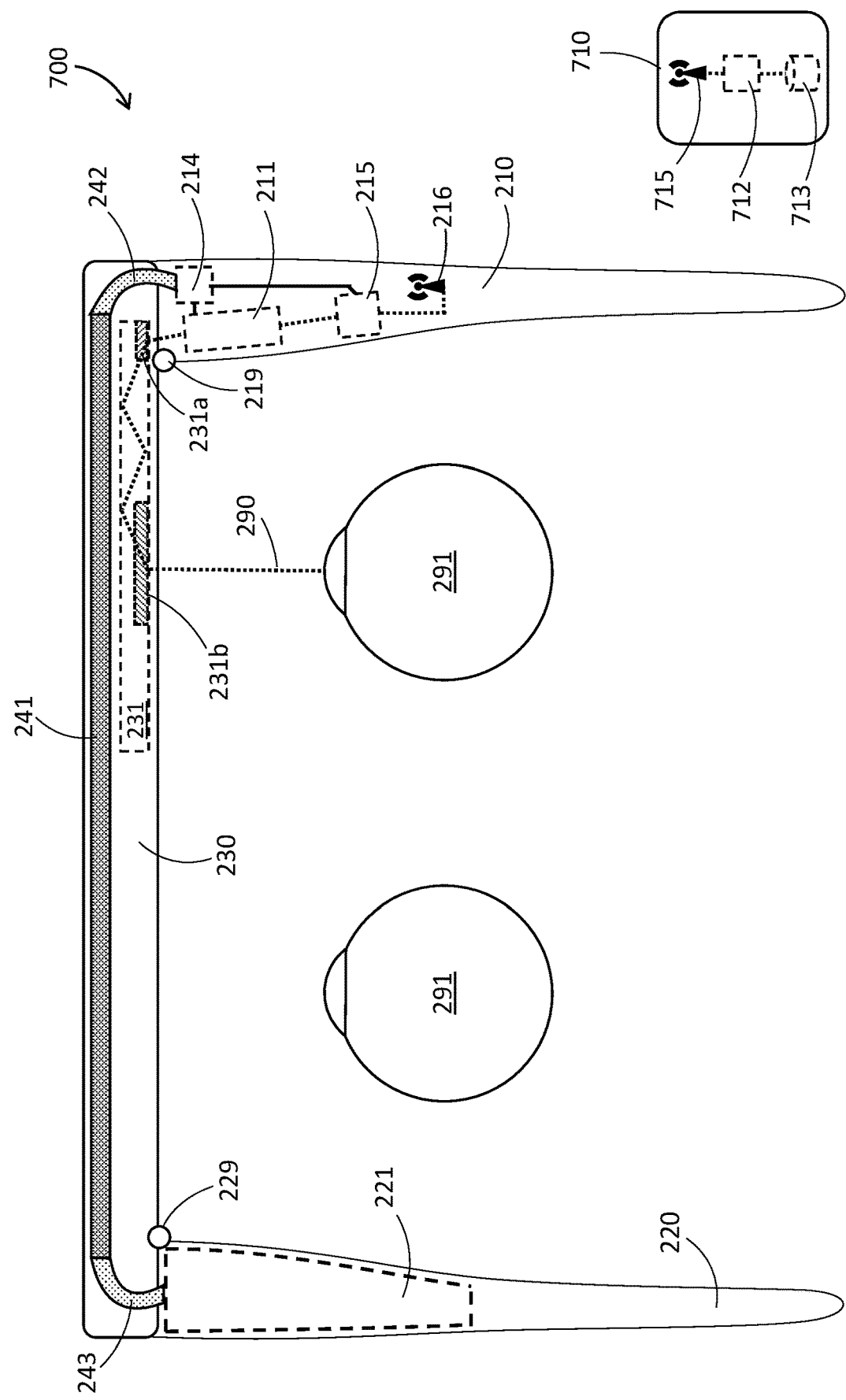
FIG. 7 is a top schematic view of yet another exemplary WHUD in accordance with the present systems, devices, and methods.

FIG. 7 is a top schematic view of a WHUD 700. WHUD 700 can be similar in at least some respects to WHUD 200 of FIGS. 2A-2C. Unless context clearly dictates otherwise, the description relating to components of WHUD 200 can be applicable to similarly numbered components of WHUD 700. Further, WHUD 700 can transition between a folded configuration and an unfolded configuration similarly to WHUD 200 as illustrated in FIGS. 2A-2C. FIG. 7 also illustrates a peripheral device 710 with which WHUD 700 communicates. As discussed in detail below, some processing and/or long-range communication can be off-loaded to peripheral device 710 instead of WHUD 700, to reduce size and/or power consumption of WHUD 700.

Peripheral device 710 can include at least one processor 712, a non-transitory processor-readable storage medium 713, and a communications module 715. WHUD 700 can also include a communications module 215. Communications module 215 and communications module 715 could for example be wired connection interfaces, such that WHUD 700 and peripheral device 710 communicate over a wired interface. Alternatively, communications module 215 and communications module 715 could for example be wireless communications modules. In such a case, each of communications module 215 and communications module 715 may include an antenna or may be coupled to an antenna. One skilled in the art will appreciate that even though communications module 215 is illustrated as being carried in the first arm 210 of WHUD 700, communications module 215 could be carried in any appropriate configuration on WHUD 700. For example, since there can be advantages to having a wireless receiver occupy a large space (such as for example with a TV antenna), communications module 215 may extend throughout or beyond first arm 210, or may be carried by a different portion of WHUD 700 entirely. In one illustrative implementation shown in FIG. 7, communications module 215 may be coupled to an antenna 216 within first arm 210. Such an antenna may coil within first arm, or extend away from front frame 230 towards a rear end of first arm 210, for example. In other implementations, communications module 215 may couple to an antenna which is carried by at least a portion of front frame 230, as discussed in more detail below with reference to FIGS. 8A and 8B.

In one exemplary implementation, non-transitory processor-readable storage medium 713 carries processor-executable instructions which can be executed by the at least one processor 712, and the results of the executed instructions can be transmitted by communications module 715. Exemplary systems in which at least some hardware can be carried by a peripheral device instead of a WHUD are described in U.S. Provisional Patent Application Ser. No. 61/989,848 (now U.S. Non-Provisional patent application Ser. No. 14/704,663).

The results of the executed instructions can be received by communications module 215 carried by WHUD 700. Communications module 215 is communicatively coupled to at least light engine 211. In this way, display data can be processed and/or rendered by at least one processor 712, sent to WHUD 700 via communications module 715 and communications module 215, and displayed using light engine 211. In summary, processing of data can be off-loaded from the WHUD 700 to the peripheral device 710. This can reduce the quantity and size of the processing components used in WHUD 700, and can also reduce the power consumed by WHUD 700, improving operating time and/or allowing for a smaller power source to be used. Consequently, the implementation shown in FIG. 7 can significantly reduce the weight and bulk of a wearable heads-up display, improving comfort and visual appeal for users.

One skilled in the art will appreciate that even though FIG. 7 only illustrates at least one processor carried by the peripheral device 710, it is still possible for WHUD 700 to also carry at least one processor such as at least one processor 212 described with reference to FIGS. 2A-2C. This will allow for WHUD 700 to perform some processing, while also allowing some processing to be off-loaded to the peripheral device 710, thus improving flexibility of the system.

In another exemplary implementation, communications module 215 may be limited to short-range communications in order to reduce power consumption or to reduce the required hardware components. On the other hand, communications module 715 may be capable of long-range communication. As examples, communications module 215 may be a wire connection interface, or may only include short range wireless communications hardware, limiting communications module 215 to short-range wireless communication such as Bluetooth®, Zigbee®, WiFi®, or other short-range wireless communication protocols. On the other hand, communications module 715 may be capable of such short-range communication with communication module 215, but may also be capable of long-range communication, such as telecommunication standards like 2G, 3G, 4G, LTE, 5G, etc. In such an implementation, peripheral device 710 may acts as a connection intermediary for WHUD 700, enabling WHUD 700 to conduct long-range communications through peripheral device 710 without requiring long-range communications hardware on WHUD 700, and without WHUD 700 consuming the power of long-range communications. Exemplary communication delegation systems are described in U.S. Provisional Patent Application No. 62/716,172, U.S. Provisional Patent Application No. 62/716,177, and U.S. Provisional Patent Application No. 62/716,175.

In some implementations, peripheral device 710 could be a multi-purpose device such as a smartphone, a tablet, a laptop, a smartwatch, a desktop computer, a PDA, or any other appropriate device. In other implementations, peripheral device 710 could be a purpose-built device such as a processing pack and/or a telecommunications pack designed specifically for use with a WHUD 700.

Figure 8A:
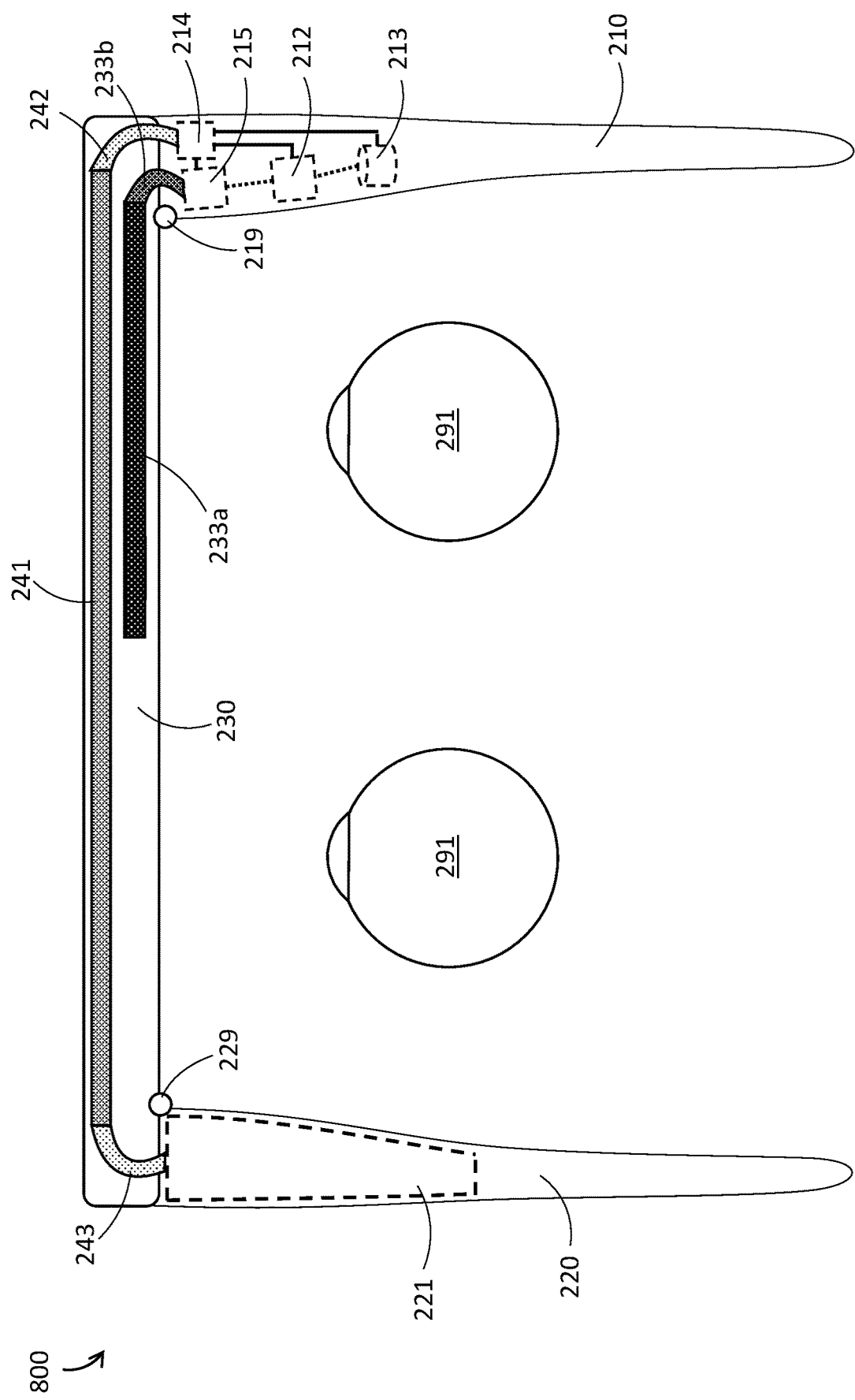
FIG. 8A is a top schematic view of yet another exemplary WHUD in accordance with the present systems, devices, and methods.

FIG. 8A is a top schematic view of a WHUD 800. WHUD 800 can be similar in at least some respects to WHUD 200 of FIGS. 2A-2C. Unless context clearly dictates otherwise, the description relating to components of WHUD 200 can be applicable to similarly numbered components of WHUD 800. Further, WHUD 800 can transition between a folded configuration and an unfolded configuration similarly to WHUD 200 as illustrated in FIGS. 2A-2C. Further still, WHUD 800 does not show a light engine or display optics, in order to avoid clutter and to more clearly show the discussed features of WHUD 800. However, one skilled in the art will appreciate that WHUD 800 could include any of the display architectures discussed herein, such as light engine 211 and waveguide combiner 231 discussed with reference to FIGS. 2A-2C, or light engine 1011 and holographic combiner 1031 discussed with reference to FIG. 10.

One difference between WHUD 800 and WHUD 200 is that WHUD 800 illustrates a communications module 215 carried by first arm 210, communications module 215 coupled to at least one antenna 233a carried by front frame 230. Antenna 233a can for example be a coaxial cable extending at least partially through front frame 230. Antenna 233a is shown as being coupled to communications module 215 across hinge 219 by a set of electrically conductive current paths 233b. In such an implementation, antenna 233a can be a non-dynamic antenna, whereas the set of electrically conductive current paths 233b can be dynamic. However, in some implementations, antenna 233a and the set of electrically conductive current paths 233b can be formed as a single dynamic cable, with acceptable impedance. In such an implementation, antenna 233a can be considered as including the set of electrically conductive current paths 233b. Such a configuration advantageously allows the antenna to repeatedly flex across hinge 219, but also simplifies manufacturing by reducing the number of necessary components. Further, such a configuration also prevents potential signal power loss at a connection between the set of electrically conductive current paths 233b and antenna 233a.

Figure 8B:
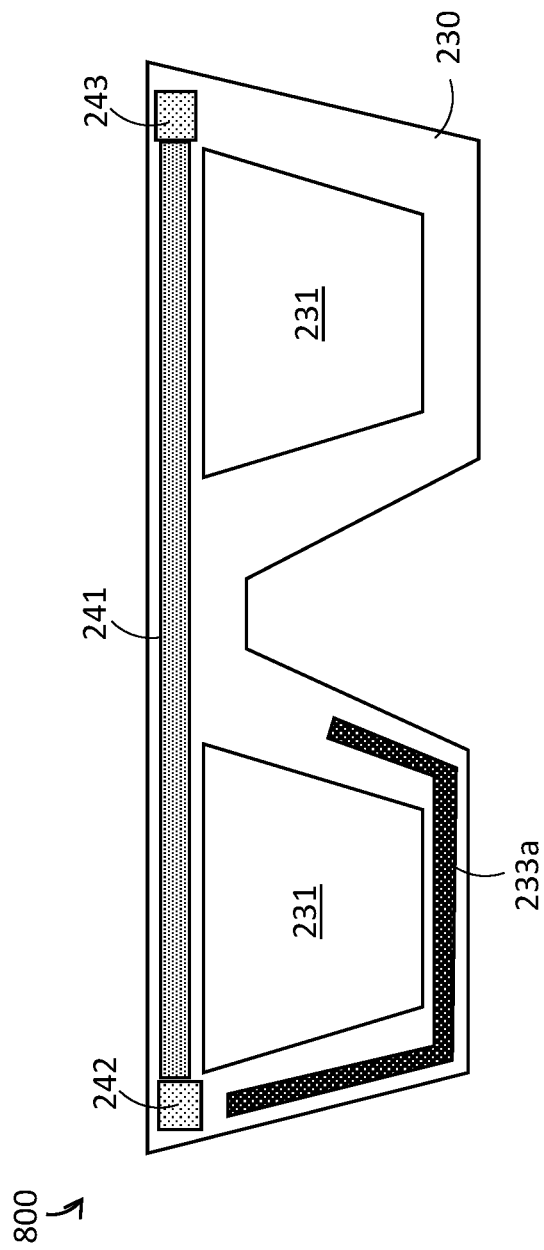
FIG. 8B is a front view of the exemplary WHUD of FIG. 8A.

FIG. 8B is a front view of WHUD 800, which shows antenna 233a running along a bottom portion of front frame 230. Running antenna 233a at least partially through front frame 230 can increase the size of antenna 233a compared to if the antenna were carried solely in first arm 210, and thus the transmission strength of antenna 233a can be improved. Exemplary antenna constructions are described in at least U.S. Provisional Patent Application Ser. No. 62/609,607, U.S. Provisional Patent Application Ser. No. 62/609,681, U.S. Provisional Patent Applicant Ser. No. 62/670,200 (now U.S. Non-Provisional patent application Ser. Nos. 16/231,275 and 16/231,279), U.S. Provisional Patent Application Ser. No. 62/695,591 (now U.S. Non-Provisional patent application Ser. Nos. 16/231,270, 16/231,271, and 16/231,273), and U.S. Provisional Patent Application Ser. No. 62/690,280 (now U.S. Non-Provisional patent application Ser. No. 16/231,332).

Figure 8C:
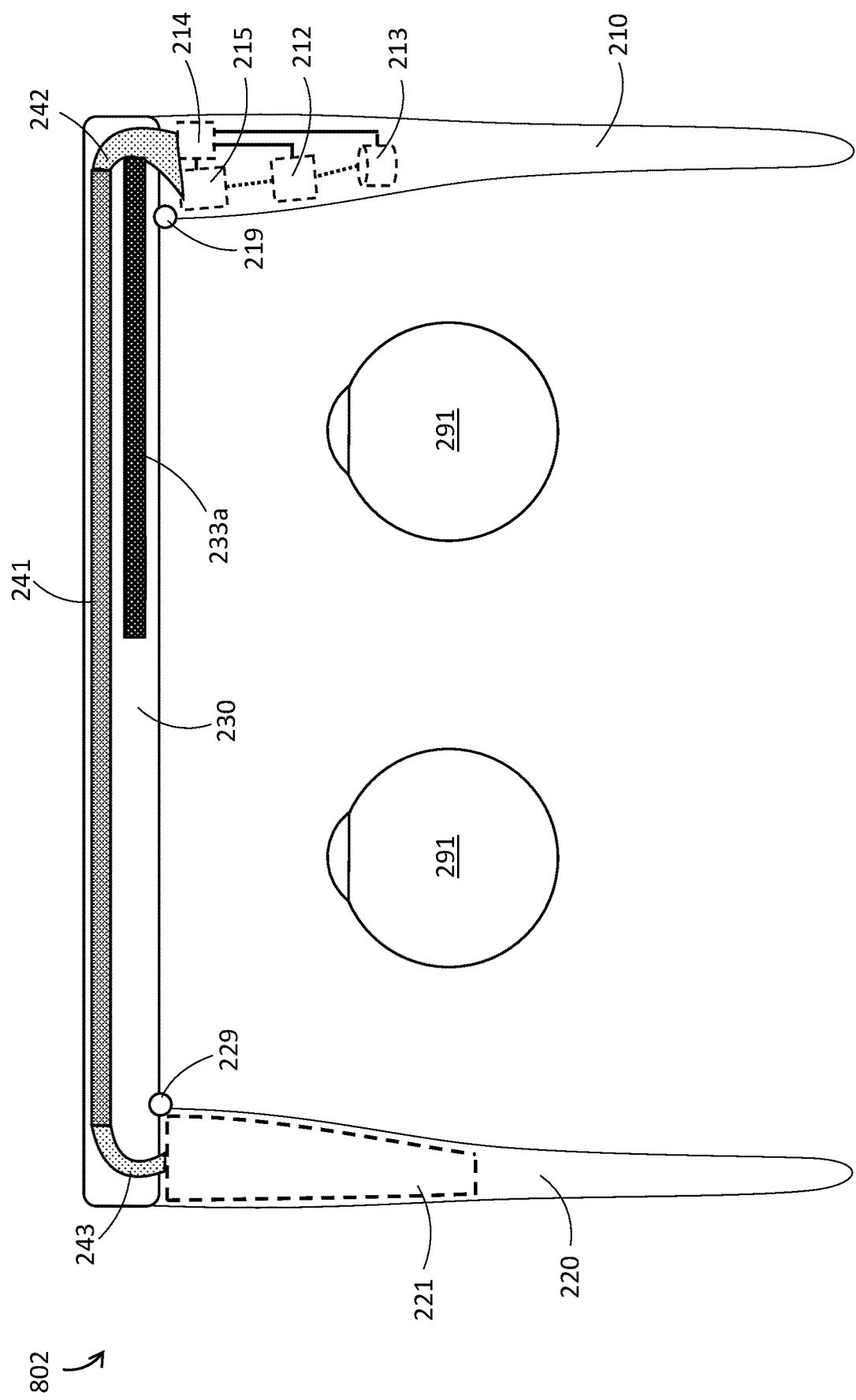
FIG. 8C is a top schematic view of yet another exemplary WHUD in accordance with the present systems, devices, and methods.

FIG. 8C is a top schematic view of a WHUD 802. WHUD 802 can be similar in at least some respects to WHUD 800 of FIGS. 8A and 8B. Unless context clearly dictates otherwise, the description relating to components of WHUD 800 can be applicable to similarly numbered components of WHUD 802. Further, WHUD 802 can transition between a folded configuration and an unfolded configuration similarly to WHUD 200 as illustrated in FIGS. 2A-2C. Further still, WHUD 802 does not show a light engine or display optics, in order to avoid clutter and to more clearly show the discussed features of WHUD 802. However, one skilled in the art will appreciate that WHUD 802 could include any of the display architectures discussed herein, such as light engine 211 and waveguide combiner 231 discussed with reference to FIGS. 2A-2C, or light engine 1011 and holographic combiner 1031 discussed with reference to FIG. 10.

One difference between WHUD 802 and WHUD 800 is that in WHUD 802, antenna 233a can be coupled to communications module 215 by at least one current path in the set of electrically conductive current paths 242. In one exemplary implementation, the set of electrically conductive current paths 242 could include at least one electrically conductive current path which is coupled to antenna 233a at a coupling, such that antenna 233a and the set of electrically conductive current paths 242 are separate components. In such an implementation, antenna 233a could be a non-dynamic antenna, whereas the set of electrically conductive current paths 242 could be dynamic. In another exemplary implementation, antenna 233a could be at least one continuous electrically conductive current path included in the set of electrically conductive current paths 242, such that electrically conductive current paths which span the hinge are grouped together. In such an implementation, antenna 233a could branch away from the set of electrically conductive current paths 242 in front frame 230, to a position which is suitable for sending and or receiving signals.

Figure 9:
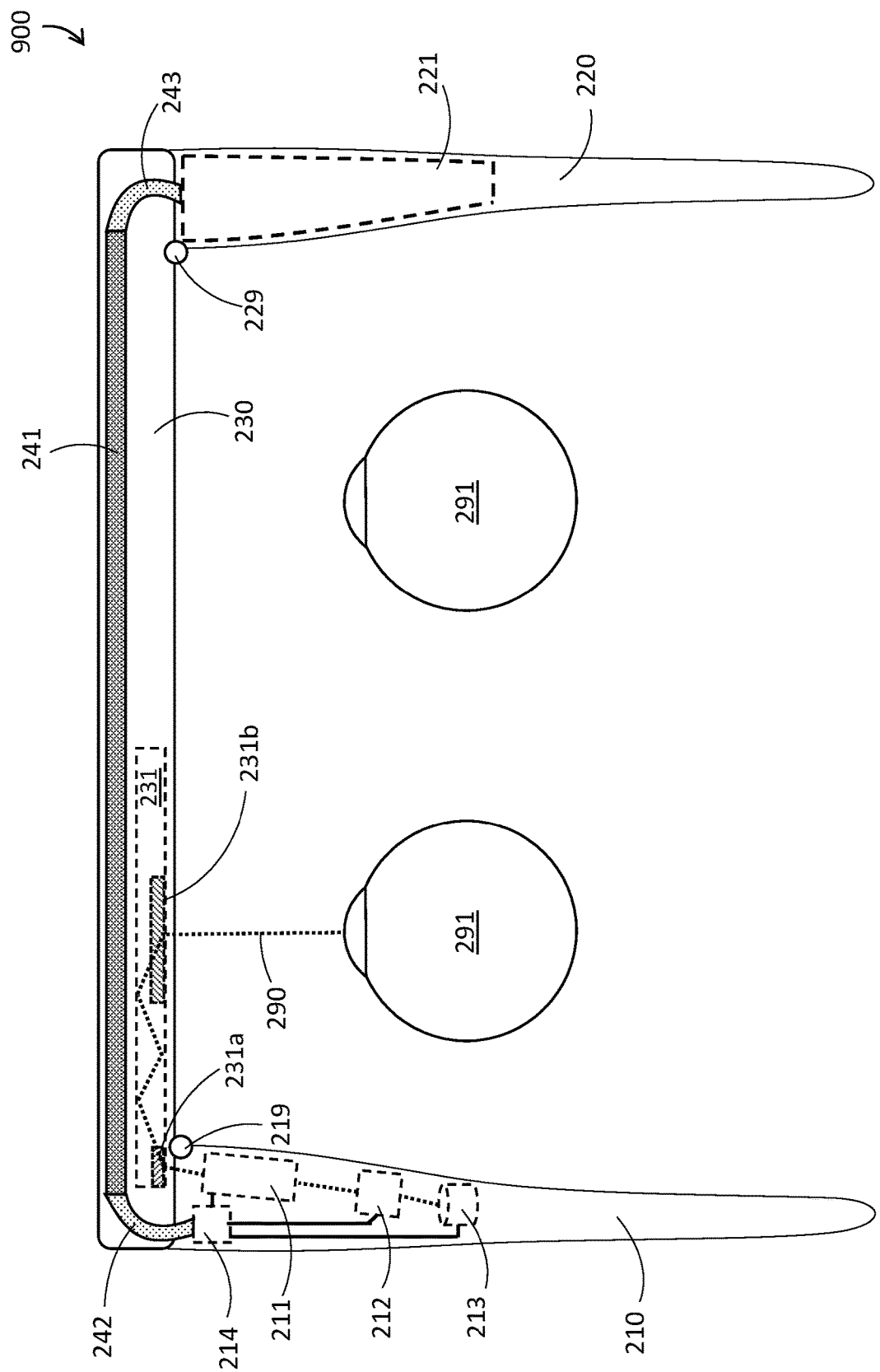
FIG. 9 is a top schematic view of yet another exemplary WHUD in accordance with the present systems, devices, and methods.

FIG. 9 is a top schematic view of a WHUD 900. WHUD 900 can be similar in at least some respects to WHUD 200 of FIGS. 2A-2C. Unless context clearly dictates otherwise, the description relating to components of WHUD 200 can be applicable to similarly numbered components of WHUD 900. Further, WHUD 900 can transition between a folded configuration and an unfolded configuration similarly to WHUD 200 as illustrated in FIGS. 2A-2C.

One difference between WHUD 900 and WHUD 200 is that the orientation of the components in WHUD 900 are reversed relative to WHUD 200. In particular, in WHUD 200, first arm 210 is to be positioned on a right side of the head of a user when worn and second arm 220 is to be positioned on a left side of the head of the user when worn. On the other hand, in WHUD 900, first arm 210 is to be positioned on a left side of the head of a user when worn and second arm 220 is to be positioned on a right side of the head of the user when worn. This reversal of the orientation of a WHUD is fully applicable to any of the WHUDs described herein.

Figure 10:
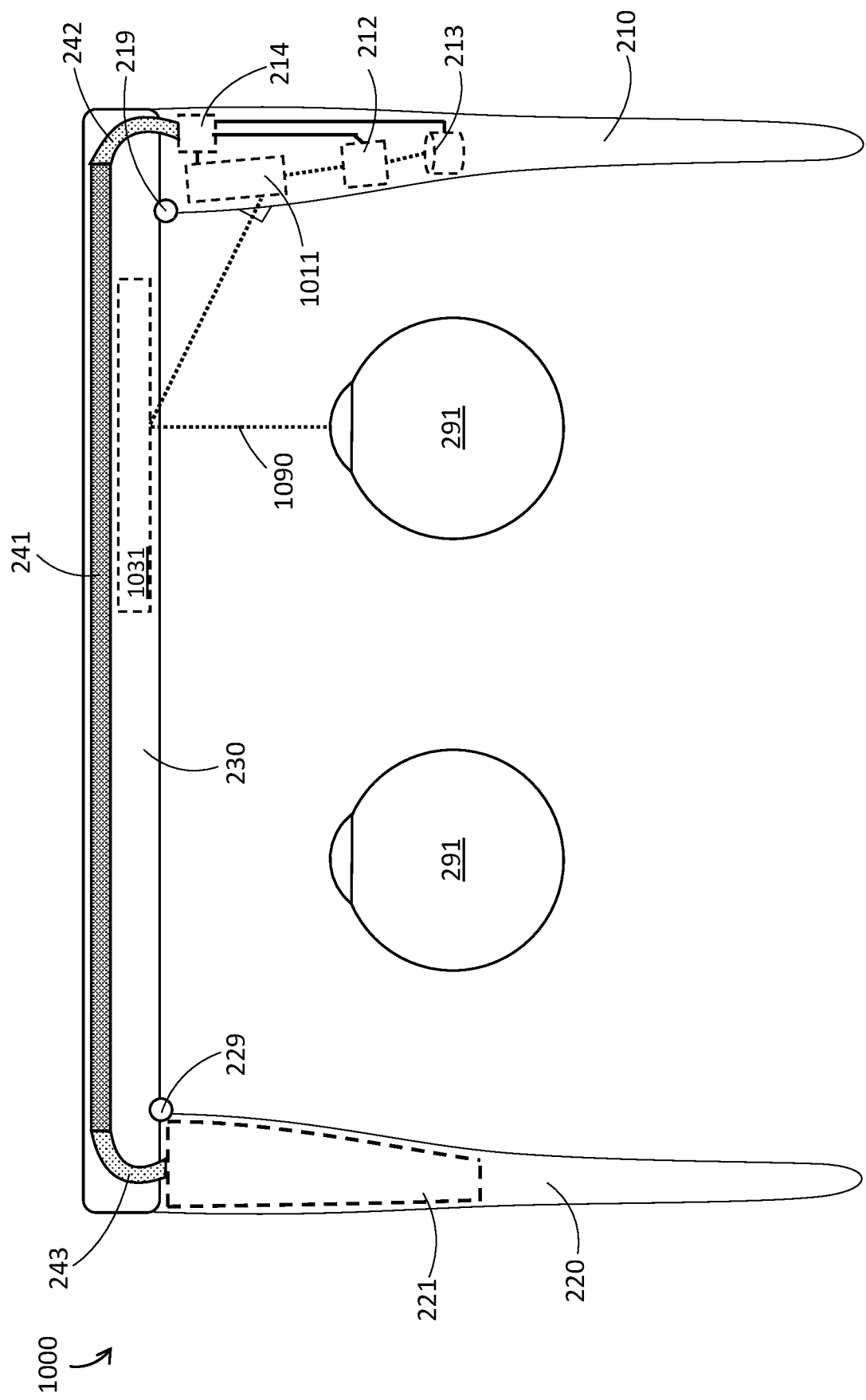
FIG. 10 is a top schematic view of yet another exemplary WHUD in accordance with the present systems, devices, and methods.

FIG. 10 is a top schematic view of a WHUD 1000. WHUD 1000 can be similar in at least some respects to WHUD 200 of FIGS. 2A-2C. Unless context clearly dictates otherwise, the description relating to components of WHUD 200 can be applicable to similarly numbered components of WHUD 1000. Further, WHUD 1000 can transition between a folded configuration and an unfolded configuration similarly to WHUD 200 as illustrated in FIGS. 2A-2C.

One difference between WHUD 1000 and WHUD 200 is that WHUD 1000 uses a different display architecture from WHUD 200. In particular, in WHUD 1000, light engine 1011 outputs display light 1090 across a temple region of the WHUD towards optical combiner 1031 when first arm 210 is in an unfolded configuration. Light engine 1011 can be similar to light engine 211, and optical combiner 1031 can include a redirector which redirects display light 1090 towards an eye 291 of a user when WHUD 1000 is worn on a head of the user. In one exemplary implementation light engine 1011 can be a scanning laser projector which scans display light 1090 as laser light onto optical combiner 1031.

Optical combiner 1031 can be a holographic combiner, which includes at least one hologram responsive to a narrow wavelength bandwidth of light which encompasses light output by light engine 1031, to redirect laser light 1090 towards eye 291 with minimal influence on environmental light passing through optical combiner 1031. Exemplary holographic display architectures are described in at least U.S. Non-Provisional patent application Ser. No. 15/167,458, U.S. Non-Provisional patent application Ser. No. 15/046,254 now published as U.S. Pat. No. 9,989,764.

Figure 11A:
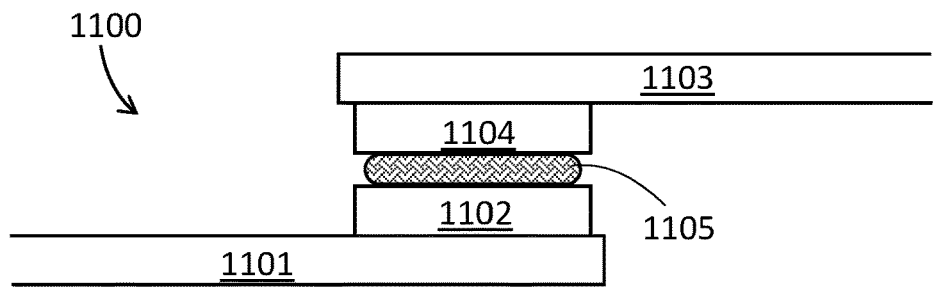
FIGS. 11A-11C are close-up views which illustrate exemplary couplings for the sets of electrically conductive current paths discussed herein.
Figure 11B:
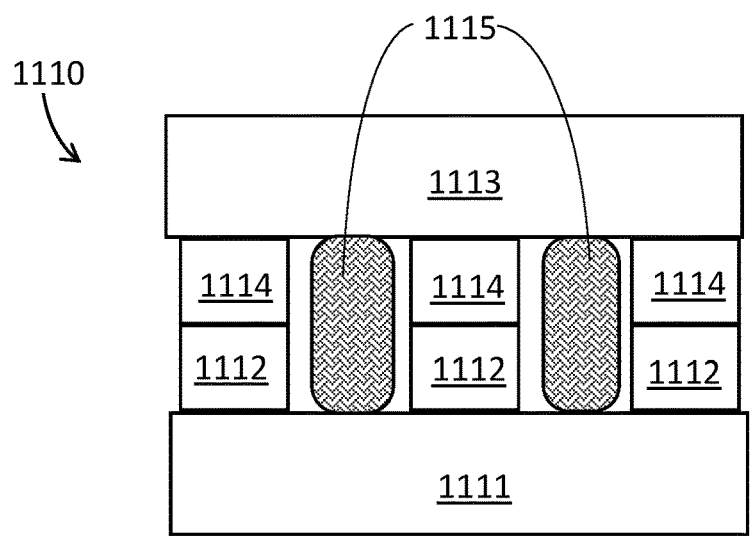
Figure 11C:
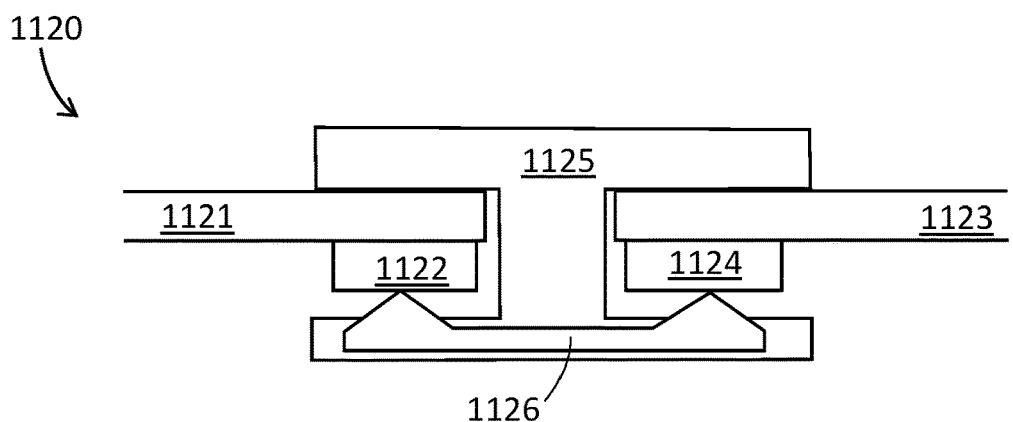

FIGS. 11A-11C are close-up views which illustrate exemplary techniques for connecting any of the respective sets of electrically conductive current paths discussed herein.

FIG. 11A shows a side view of a coupling 1100 between a set of electrically conductive current paths 1101 and a set of electrically conductive current paths 1103. The set of electrically conductive current paths 1101 can be a printed circuit board having at least one electrical contact 1102 connected to at least one conductive trace in the set of electrically conductive current paths 1101. The set of electrically conductive current paths 1101 can include a plurality of electrical contacts 1102 connected to a respective plurality of conductive traces in the set of electrically conductive current paths 1101. The set of electrically conductive current paths 1103 can be a printed circuit board having at least one electrical contact 1104 connected to at least one conductive trace in the set of electrically conductive current paths 1103. The set of electrically conductive current paths 1103 can include a plurality of electrical contacts 1104 connected to a respective plurality of conductive traces in the set of electrically conductive current paths 1103. Each electrical contact 1102 can be connected to a respective electrical contact 1104 by a respective bead 1105 of solder or conductive adhesive.

FIG. 11B shows an in-line view of a coupling 1110 between a set of electrically conductive current paths 1111 and a set of electrically conductive current paths 1113. The set of electrically conductive current paths 1111 can be a printed circuit board having at least one electrical contact 1112 connected to at least one conductive trace in the set of electrically conductive current paths 1111. The set of electrically conductive current paths 1111 can include a plurality of electrical contacts 1112 connected to a respective plurality of conductive traces in the set of electrically conductive current paths 1111. The set of electrically conductive current paths 1113 can be a printed circuit board having at least one electrical contact 1114 connected to at least one conductive trace in the set of electrically conductive current paths 1113. The set of electrically conductive current paths 1113 can include a plurality of electrical contacts 1114 connected to a respective plurality of conductive traces in the set of electrically conductive current paths 1113. Each electrical contact 1112 can be in physical contact with a respective electrical contact 1114. To ensure physical contact between contacts 1112 and contacts 1114, the set of electrically conductive current paths 1111 and the set of electrically conductive current paths 1113 can be held together by at least one bead 1115 of non-conductive adhesive in a gap between each of the electrical contacts as shown in FIG. 11B.

FIG. 11C shows a side view of a coupling 1120 between a set of electrically conductive current paths 1121 and a set of electrically conductive current paths 1123. The set of electrically conductive current paths 1121 can be a printed circuit board having at least one electrical contact 1122 connected to at least one conductive trace in the set of electrically conductive current paths 1121. The set of electrically conductive current paths 1121 can include a plurality of electrical contacts 1122 connected to a respective plurality of conductive traces in the set of electrically conductive current paths 1121. The set of electrically conductive current paths 1123 can be a printed circuit board having at least one electrical contact 1124 connected to at least one conductive trace in the set of electrically conductive current paths 1123. The set of electrically conductive current paths 1123 can include a plurality of electrical contacts 1124 connected to a respective plurality of conductive traces in the set of electrically conductive current paths 1123. A board-to-board connector 1125 can be used to couple the set of electrically conductive current paths 1121 to the set of electrically conductive current paths 1123. Board-to-board connector 1125 can be structured to receive and hold each of the set of electrically conductive current paths 1121 and the set of electrically conductive current paths 1123, with at least one conductor 1126 connecting a contact 1122 to a contact 1124. Board-to-board connector 1125 can include as many conductors 1126 as there are contacts in the set of electrically conductive current paths 1121 or the set of electrically conductive current paths 1123. In this way, a respective conductor 1126 can couple a respective electrical contact 1122 to a respective electrical contact 1124. Alternatively, board-to-board connector 1125 can be a "fan-out" or a "fan-in" connector, in that a given conductor 1126 may couple one electrical contact in one of the sets of electrically conductive current paths to a plurality of electrical contacts in the other sets of electrically conductive current paths.

In each of the implementations discussed in FIG. 11A-11C, the printed circuit boards can be rigid or flexible. Alternatively, individual wires could be used for at least one of the sets of electrically conductive current paths instead of printed circuit boards.

Figure 12A:
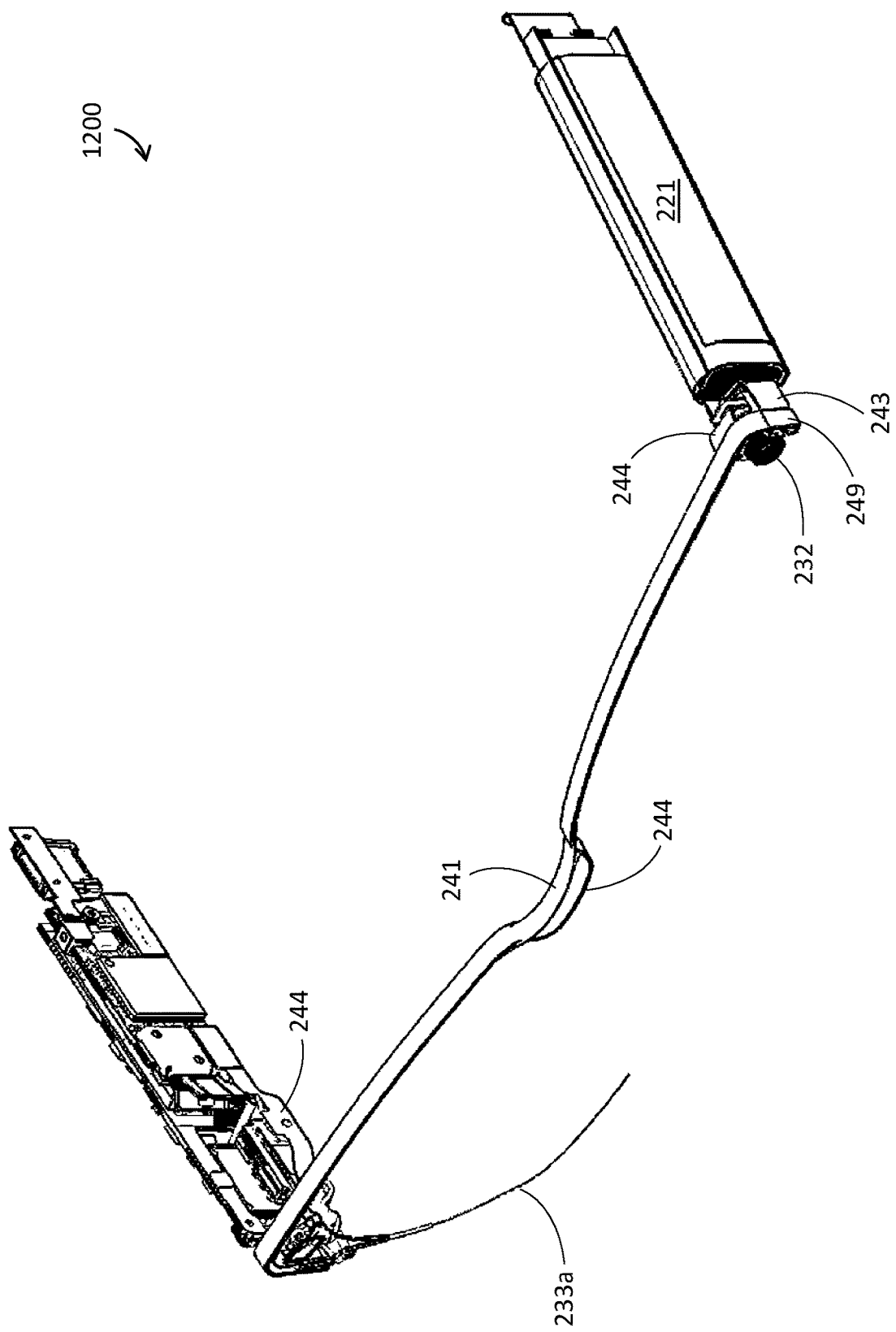
FIG. 12A is an isometric view of representative components of yet another exemplary WHUD in accordance with the present systems, devices, and methods.
Figure 12B:
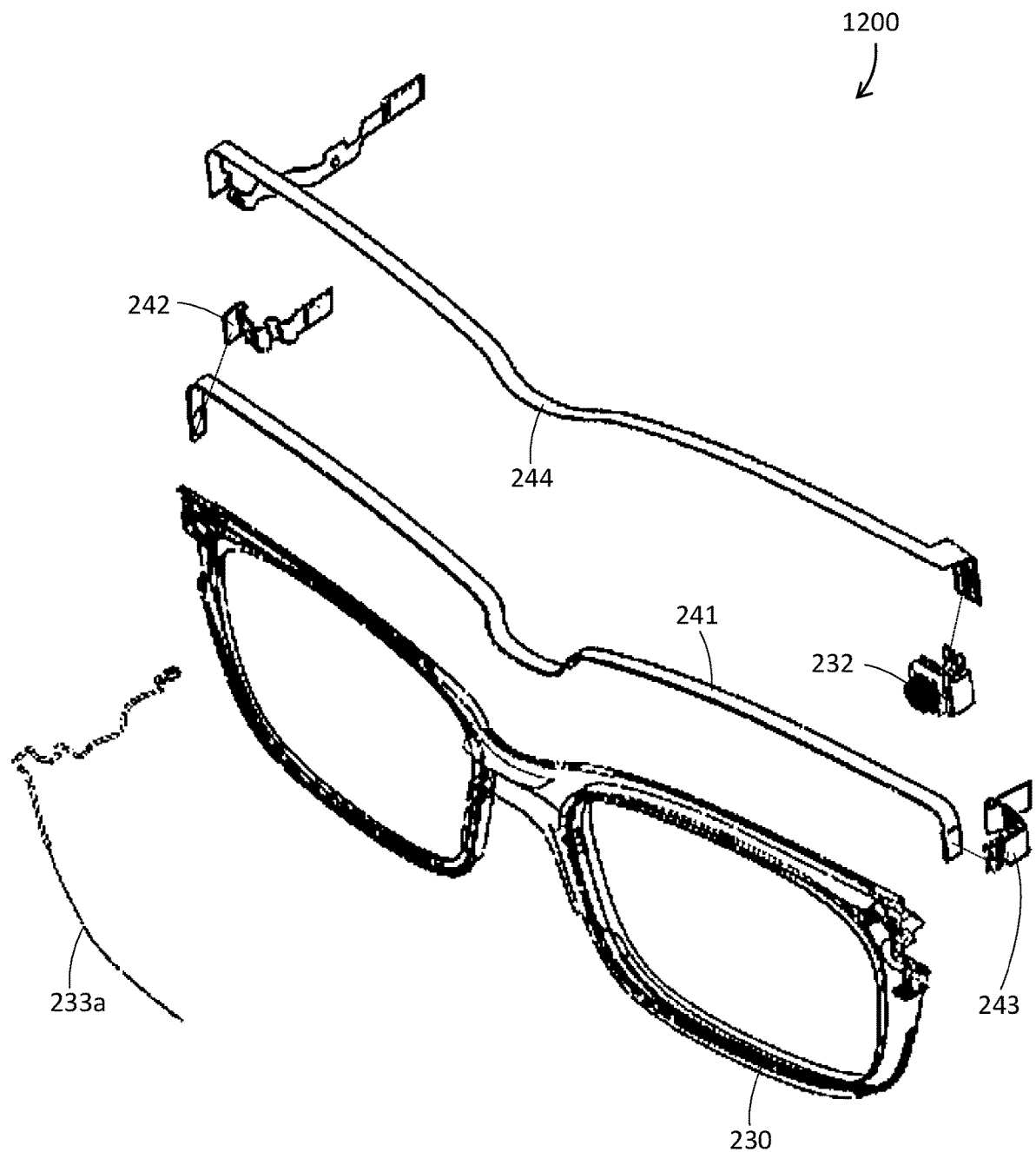
FIG. 12B is an exploded view of representative components of the exemplary WHUD of FIG. 12A.
Figure 12C:
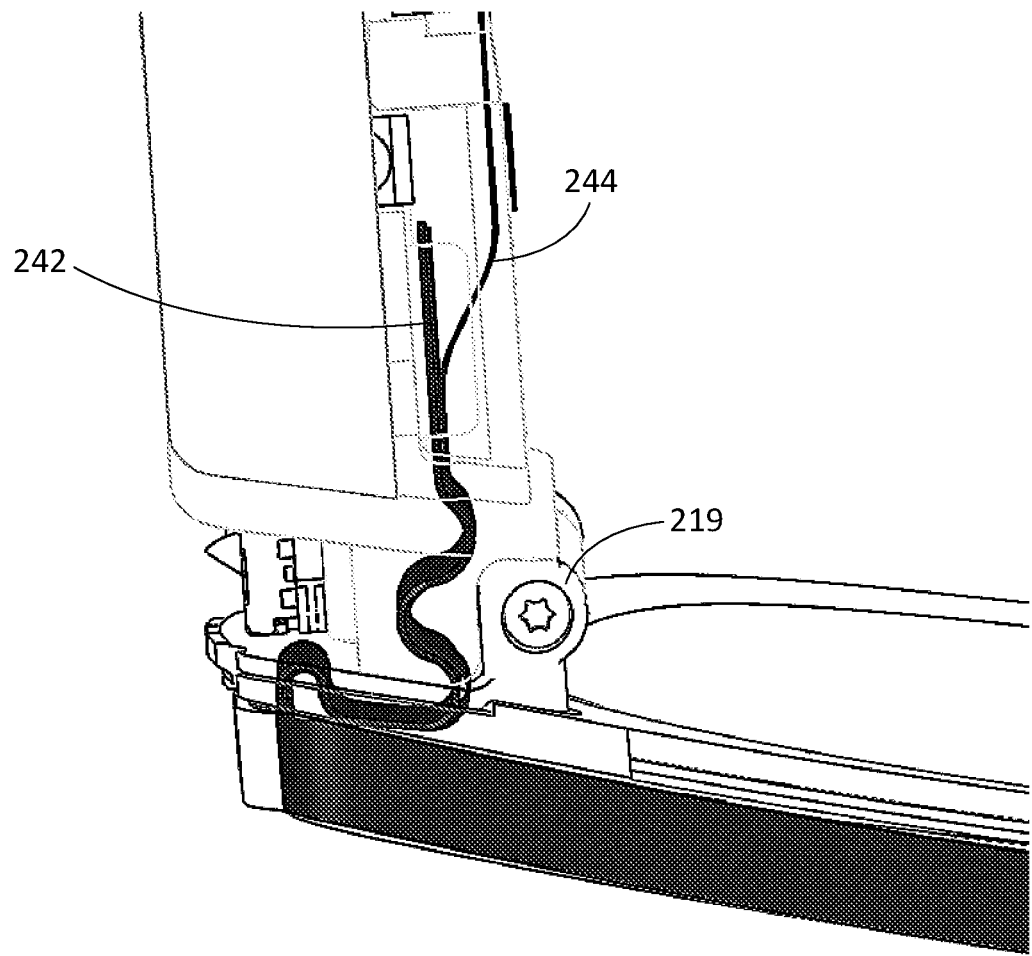
FIG. 12C is a top view of representative components of the exemplary WHUD of FIGS. 12A and 12B.

FIGS. 12A-12C discussed below are views of representative components of an exemplary WHUD 1200. WHUD 1200 can be similar in at least some respects to WHUD 200 of FIGS. 2A-2C. Unless context clearly dictates otherwise, the description relating to components of WHUD 200 can be applicable to similarly numbered components of WHUD 1200. In FIGS. 12A-12C, several components are not illustrated so as to not obscure internal components of WHUD 1200, as detailed per figure below.

FIG. 12A is an isometric view of representative components of a WHUD 1200, with several components not illustrated to more clearly illustrate internal components of WHUD 1200. For example, FIG. 12A does not illustrate external coverings, frame components, or arm components of WHUD 1200. FIG. 12B is an isometric exploded view of WHUD 1200 which shows several sets of electrically conductive current paths which can be used to connect electrical components through front frame 230 of WHUD 1200. Some connections between components of FIG. 12B are illustrated with dashed lines. FIG. 12C is a top view of a hinge which couples front frame 230 to a first arm of WHUD 1200, showing sets of electrically conductive current paths which extend across the hinge.

FIGS. 12A and 12B show a non-dynamic set of electrically conductive current paths 241 which runs across front frame 230 of WHUD 1200. One end of the set of electrically conductive current paths 241 is coupled to a dynamic set of electrically conductive current paths 242 by a board-to-board connector, and another end of the set of electrically conductive current paths 241 is coupled to a dynamic set of electrically conductive current paths 243 by a board-to-board connector 249. Together, the set of electrically conductive current paths 241, the set of electrically conductive current paths 242, and the set of electrically conductive current paths 243 serve to connect electrical components in a first arm of WHUD 1200 to power source 221 in a second arm of WHUD 1200, traversing a pair of hinges and front frame 230. FIGS. 12A and 12B additionally illustrate a camera 232 carried by front frame 230 of WHUD 1200. Although WHUD 1200 is only shown as including a single camera, WHUD 1200 could include a plurality of cameras, as discussed with reference to FIG. 3 above. A dynamic set of electrically conductive current paths 244 can connect at least one processor carried in an arm of WHUD 1200 to camera 232. FIGS. 12A and 12B also illustrate antenna 233a which runs from a communications module in a first arm of WHUD 1200 across a hinge and partially through front frame 230.

FIG. 12C illustrates dynamic set of electrically conductive current paths 242 and dynamic set of electrically conductive current paths 244 extending adjacent to each other across a hinge 219. The set of electrically conductive current paths 242 and the set of electrically conductive current paths 244 can follow a similar path across hinge 219, so that rotation of hinge 219 will result in the set of electrically conductive current paths 242 and the set of electrically conductive current paths 244 flexing similarly or together. This will advantageously reduce resistance to rotation of hinge 219 caused by the set of electrically conductive current paths 242 and the set of electrically conductive current paths 244. Further, the set of electrically conductive current paths 242 and the set of electrically conductive current paths 244 can pass through the same opening in a housing of the first arm of WHUD 1200, and can also pass through the same opening of front frame 230 of WHUD 1200, thereby reducing the number of required openings on the respective housings. In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable storage medium" can be any element that can store the program associated with logic and/or information for use by or in connection with the instruction execution system, apparatus, and/or device. The processor-readable storage medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, each of the following are incorporated by reference herein in their entirety: U.S. Non-Provisional patent application Ser. No. 15/145,576, U.S. Non-Provisional patent application Ser. No. 15/167,458, U.S. Non-Provisional patent application Ser. No. 15/046,254 now published as U.S. Pat. No. 9,989,764, U.S. Provisional Patent Application Ser. No. 61/928,568 (now U.S. Non-Provisional patent application Ser. No. 14/599,279, U.S. Provisional Patent Application Ser. No. 61/989,848 (now U.S. Non-Provisional patent application Ser. No. 14/704,663), U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Provisional Patent Application No. 62/754,339, U.S. Provisional Patent Application Ser. No. 62/782,918, U.S. Provisional Patent Application Ser. No. 62/789,908, U.S. Provisional Patent Application Ser. No. 62/845,956, U.S. Provisional Patent Application Ser. No. 62/791,514, U.S. Provisional Patent Application Ser. No. 62/716,172, U.S. Provisional Patent Application Ser. No. 62/716,177, U.S. Provisional Patent Application Ser. No. 62/716,175, U.S. Provisional Patent Application Ser. No. 62/609,607, U.S. Provisional Patent Application Ser. No. 62/609,681, U.S. Provisional Patent Applicant Ser. No. 62/670,200 (now U.S. Non-Provisional patent application Ser. Nos. 16/231,275 and 16/231,279), U.S. Provisional Patent Application Ser. No. 62/695,591 (now U.S. Non-Provisional patent application Ser. Nos. 16/231,270, 16/231,271, 16/231,273), and U.S. Provisional Patent Application Ser. No. 62/690,280 (now U.S. Non-Provisional patent application Ser. No. 16/231,332), and U.S. Provisional Patent Application No. 62/862,355. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
   a support structure to be worn on a head of a user, the support structure comprising a first arm, a second arm, and a front frame, the first arm physically coupled to the front frame by a first hinge and the second arm physically coupled to the front frame by a second hinge;
   an optical combiner carried by the front frame;
   a light engine carried by the first arm;
   a power source carried by the second arm;
   at least three respective sets of electrically conductive current paths which together provide electrical coupling between the power source and the light engine, the at least three respective sets of electrically conductive current paths including:
      a first set of electrically conductive current paths carried by the front frame;
      a second set of electrically conductive current paths that extend across the first hinge, the second set of electrically conductive current paths to provide electrical coupling between the first set of electrically conductive current paths and the light engine; and
      a third set of electrically conductive current paths that extend across the second hinge, the third set of electrically conductive current paths to provide electrical coupling between the first set of electrically conductive current paths and the power source,
      wherein the first set of electrically conductive current paths are non-dynamic electrically conductive current paths and at least one of the second set of electrically conductive current paths or the third set of electrically conductive current paths is a dynamic electrically conductive current path; and
   an additional set of electrically conductive current paths that extend across the first hinge, the additional set of electrically conductive current paths to provide electrical coupling between at least one component carried by the support structure and at least one component carried by the first arm.

2. The WHUD of claim 1, further comprising at least one processor carried by the first arm and a non-transitory processor readable storage medium carried by the first arm, wherein the at least one processor is communicatively coupled to both the non-transitory processor readable storage medium and the light engine, and the second set of electrically conductive current paths provides electrically coupling between the at least one processor and the first set of electrically conductive current paths, and between the non-transitory processor readable storage medium and the first set of electrically conductive current paths.

3. The WHUD of claim 2 wherein the at least one component carried by the support structure is at least one camera and the at least one component carried by the first arm is the at least one processor.

4. The WHUD of claim 3, further comprising a power supply circuit carried by the first arm, the second set of electrically conductive current paths to provide electrical coupling between the first set of electrically conductive current paths and the power supply circuit, and wherein the power supply circuit is electrically coupled to each of: the at least one processor, the non-transitory processor readable storage medium, and the light engine.

5. The WHUD of claim 4, the additional set of electrically conductive current paths further to provide electrical coupling between the power supply circuit and the at least one camera across the first hinge.

6. The WHUD of claim 2, the second set of electrically conductive current paths to provide direct electrical coupling between the first set of electrically conductive current paths and each of: the at least one processor, the non-transitory processor readable storage medium, and the light engine.

7. The WHUD of claim 1 wherein each of the first set of electrically conductive current paths, the second set of electrically conductive current paths, the third set of electrically conductive current paths, and the additional set of electrically conductive current paths is carried by a respective printed circuit board.

8. The WHUD of claim 1, the second set of electrically conductive current paths to provide electrical coupling between the first set of electrically conductive current paths and the light engine when the first hinge is in an unfolded configuration.

9. The WHUD of claim 1, the third set of electrically conductive current paths to provide electrical coupling between the first set of electrically conductive current paths and the power source when the second hinge is in an unfolded configuration.

10. The WHUD of claim 1, the third set of electrically conductive current paths to provide direct electrical coupling between the power source and the first set of electrically conductive current paths.

11. The WHUD of claim 1 wherein the first set of electrically conductive current paths is electrically coupled to the second set of electrically conductive current paths by at least one coupling mechanism selected from a group comprising: a board-to-board connector, solder, and adhesive, and wherein the first set of electrically conductive current paths is electrically coupled to the third set of electrically conductive current paths by at least one coupling mechanism selected from a group comprising: a board-to-board connector, solder, and adhesive.

12. The WHUD of claim 1, further comprising:
a wireless communications module carried by the first arm;
an antenna carried by the front frame; and
a fifth set of electrically conductive current pathways that extend across the first hinge to provide electrical coupling between the antenna and the wireless communications module.

13. The WHUD of claim 1, further comprising:
a wireless communications module carried by the first arm; and
an antenna carried by the front frame, the antenna extending across the first hinge and electrically coupled to the wireless communications module.

14. The WHUD of claim 1, further comprising:
a wireless communications module carried by the first arm; and
an antenna carried by the first arm, the antenna electrically coupled to the wireless communications module.

15. The WHUD of claim 1 wherein the light engine comprises at least one component selected from a group comprising: a projector, a scanning laser projector, a microdisplay, and a white-light source.

16. The WHUD of claim 1 wherein the optical combiner comprises at least one optical component selected from a group comprising: a waveguide, a holographic optical element, a prism, a diffraction grating, a light reflector, a light reflector array, a light refractor, and a light refractor array.

17. The WHUD of claim 1, wherein the optical combiner is carried by a lens and the lens is carried by the front frame of the support structure.

18. The WHUD of claim 1, the optical combiner comprising a waveguide, an incoupler, and an outcoupler, wherein:
the incoupler is positioned and oriented to receive display light output by the light engine when the first hinge is in an unfolded configuration and to redirect the display light into the waveguide;
the waveguide is positioned and oriented to direct the display light to the outcoupler; and
the outcoupler is positioned and oriented to redirect the display light out of the waveguide and towards the eye of the user when the support structure is worn on the head of the user.

19. The WHUD of claim 1 wherein the optical combiner includes at least one hologram, the light engine is positioned and oriented to project the display light onto the at least one hologram when the first hinge is in an unfolded configuration, and the at least one hologram is positioned and oriented to redirect the display light towards the eye of the user when the support structure is worn on the head of the user.

20. A wearable heads-up display ("WHUD") comprising:
a support structure to be worn on a head of a user, the support structure comprising a first arm, a second arm, and a front frame, the first arm physically coupled to the front frame by a first hinge and the second arm physically coupled to the front frame by a second hinge;
an optical combiner carried by the front frame;
a light engine carried by the first arm;
a power source carried by the second arm;
at least three respective sets of electrically conductive current paths which together provide electrical coupling between the power source and the light engine, the at least three respective sets of electrically conductive current paths including:
a first set of electrically conductive current paths carried by the front frame;
a second set of electrically conductive current paths that extend across the first hinge, the second set of electrically conductive current paths to provide electrical coupling between the first set of electrically conductive current paths and the light engine; and
a third set of electrically conductive current paths that extend across the second hinge, the third set of electrically conductive current paths to provide electrical coupling between the first set of electrically conductive current paths and the power source,
wherein at least one of the first set of electrically conductive current paths, the second set of electrically conductive current paths, or the third set of electrically conductive current paths is disconnected from one or more of the other sets of electrically conductive current paths when the WHUD is in a folded configuration; and
an additional set of electrically conductive current paths that extend across the first hinge, the additional set of electrically conductive current paths to provide electrical coupling between at least one component situated within the support structure and at least one component situated in the first arm.

\* \* \* \* \*